(12) United States Patent
Akashi et al.

(10) Patent No.: US 11,855,912 B2
(45) Date of Patent: Dec. 26, 2023

(54) NETWORK MANAGEMENT APPARATUS, METHOD, AND PROGRAM

(71) Applicant: Nippon Telegraph and Telephone Corporation, Tokyo (JP)

(72) Inventors: Kazuaki Akashi, Musashino (JP); Masataka Sato, Musashino (JP); Shingo Horiuchi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/795,187

(22) PCT Filed: Feb. 7, 2020

(86) PCT No.: PCT/JP2020/004975
§ 371 (c)(1),
(2) Date: Jul. 25, 2022

(87) PCT Pub. No.: WO2021/157089
PCT Pub. Date: Aug. 12, 2021

(65) Prior Publication Data
US 2023/0092999 A1    Mar. 23, 2023

(51) Int. Cl.
*H04L 47/70* (2022.01)
*H04L 47/783* (2022.01)

(52) U.S. Cl.
CPC .......... *H04L 47/829* (2013.01); *H04L 47/783* (2013.01)

(58) Field of Classification Search
None
See application file for complete search history.

(56) References Cited

U.S. PATENT DOCUMENTS

2013/0212279 A1 *  8/2013  Dutta .................... G06F 9/5077
                                                         709/226
2018/0041578 A1 *  2/2018  Lee ........................ H04L 47/70

FOREIGN PATENT DOCUMENTS

JP          201837982         3/2018

OTHER PUBLICATIONS

TM Forum, "Information Framework (SID): Physical Resource Business Entities," Information Framework Suite, GB922 Physical Resource Release 18.0.1, Oct. 2018, 73 pages.

(Continued)

*Primary Examiner* — Scott B Christensen
(74) *Attorney, Agent, or Firm* — Fish & Richardson P.C.

(57) ABSTRACT

A network management device according to one embodiment includes a device that stores rules for mapping between a service order and a resource order; a device that stores, when a mapping is performed based on the mapping rules, a mapping history in which an identifier of a service for the service order which is a mapping source, a type of a rule used for the mapping, and an identifier of a resource for the resource order which is a mapping target are described; and a creation unit that, when a service order to change the service is created, acquires, from the mapping history and the identifier of the service to be changed, information indicating types of rules to be used for mapping of the service order to change the service and the identifier of the resource for a resource order which is a mapping target, and creates a resource order by mapping of the order to be changed based on the acquired mapping rules.

15 Claims, 32 Drawing Sheets

(56) References Cited

OTHER PUBLICATIONS

TM Forum, "Information Framework (SID): Logical Resource and Compound Resource Business Entities," Information Framework Suite, GB922 Logical and Compound Resource Release 18.5.1, Mar. 2019, 65 pages.

TM Forum, "Information Framework (SID): Service Overview Business Entities," Information Framework Suite, GB922 Service Overview Release 18.5.1, Mar. 2019, 81 pages.

\* cited by examiner

Fig. 3

| SERVICE SPECIFICATION | |
|---|---|
| IDENTIFIER | VPN SERVICE SPECIFICATION |
| ATTRIBUTE INFORMATION | USER NAME |
| | BANDWIDTH |
| | CONNECTION LOCATION LIST |

Fig. 4

| SERVICE | | |
|---|---|---|
| IDENTIFIER | | VPN SERVICE 1 |
| SERVICE SPECIFICATION | | VPN SERVICE SPECIFICATION |
| ATTRIBUTE INFORMATION | USER NAME | USER A |
| | BANDWIDTH | 100Mbps |
| | CONNECTION LOCATION LIST | LOCATION X |
| | | LOCATION Y |

Fig. 5

| RESOURCE SPECIFICATION | |
|---|---|
| IDENTIFIER | PHYSICAL PORT SPECIFICATION |
| ATTRIBUTE INFORMATION | INSTALLATION LOCATION |

Fig. 6

| RESOURCE | | |
|---|---|---|
| IDENTIFIER | | PHYSICAL PORT 1 |
| RESOURCE SPECIFICATION | | PHYSICAL PORT SPECIFICATION |
| ATTRIBUTE INFORMATION | INSTALLATION LOCATION | LOCATION X |

| | | |
|---|---|---|
| IDENTIFIER | | PHYSICAL PORT 2 |
| RESOURCE SPECIFICATION | | PHYSICAL PORT SPECIFICATION |
| ATTRIBUTE INFORMATION | INSTALLATION LOCATION | LOCATION Y |

| RESOURCE SPECIFICATION | |
|---|---|
| IDENTIFIER | VLAN ENDPOINT SPECIFICATION |
| ATTRIBUTE INFORMATION | VLAN ID |
| | BANDWIDTH |
| | PHYSICAL PORT |

| IDENTIFIER | VLAN PATH SPECIFICATION |
|---|---|
| ATTRIBUTE INFORMATION | VLAN ID |
| | BANDWIDTH |
| | CONNECTION ENDPOINT LIST |

Fig. 8

| RESOURCE | | |
|---|---|---|
| IDENTIFIER | | VLAN ENDPOINT 1 |
| RESOURCE SPECIFICATION | | VLAN ENDPOINT SPECIFICATION |
| ATTRIBUTE INFORMATION | VLAN ID | 1234 |
| | BANDWIDTH | 100Mbps |
| | PHYSICAL PORT | PHYSICAL PORT 1 |

⋮

| | | |
|---|---|---|
| IDENTIFIER | | VLAN PATH 1 |
| RESOURCE SPECIFICATION | | VLAN PATH SPECIFICATION |
| ATTRIBUTE INFORMATION | VLAN ID | 1234 |
| | BANDWIDTH | 100Mbps |
| | CONNECTION ENDPOINT LIST | VLAN ENDPOINT 1 |
| | | VLAN ENDPOINT 2 |

Fig. 9

| SERVICE ORDER (CREATE) ||||
|---|---|---|---|
| ORDER TYPE: CREATE ||||
| ORDER CONTENT: ||||
| IDENTIFIER || VPN SERVICE 1 ||
| SERVICE SPECIFICATION || VPN SERVICE SPECIFICATION ||
| ATTRIBUTE INFORMATION | USER NAME | USER A ||
| | BANDWIDTH | 100Mbps ||
| | CONNECTION LOCATION LIST | LOCATION X ||
| | | LOCATION Y ||

Fig. 10

| RESOURCE ORDER (CREATE) | | |
|---|---|---|
| ORDER TYPE: CREATE | | |
| ORDER CONTENT: | | |
| IDENTIFIER | | VLAN ENDPOINT 2 |
| RESOURCE SPECIFICATION | | VLAN ENDPOINT SPECIFICATION |
| ATTRIBUTE INFORMATION | VLAN ID | 1234 |
| | BANDWIDTH | 100Mbps |
| | PHYSICAL PORT | PHYSICAL PORT 2 |

Fig. 11

| SERVICE ORDER (DELETE) | | |
|---|---|---|
| ORDER TYPE: DELETE | | |
| ORDER CONTENT: | | |
| IDENTIFIER | | VPN SERVICE 1 |
| SERVICE SPECIFICATION | | VPN SERVICE SPECIFICATION |
| ATTRIBUTE INFORMATION | USER NAME | USER A |
| | BANDWIDTH | 100Mbps |
| | CONNECTION LOCATION LIST | LOCATION X |
| | | LOCATION Y | a

Fig. 12

| RESOURCE ORDER (DELETE) | |
|---|---|
| ORDER TYPE: DELETE | |
| ORDER CONTENT: | |
| IDENTIFIER | VLAN ENDPOINT 2 |
| RESOURCE SPECIFICATION | VLAN ENDPOINT SPECIFICATION |
| ATTRIBUTE INFORMATION — VLAN ID | 1234 |
| BANDWIDTH | 100Mbps |
| PHYSICAL PORT | PHYSICAL PORT 2 | a

Fig. 13

| SERVICE ORDER (CHANGE) | | |
|---|---|---|
| ORDER TYPE: CHANGE | | |
| ORDER CONTENT: | | |
| IDENTIFIER | | VPN SERVICE 1 |
| SERVICE SPECIFICATION | | VPN SERVICE SPECIFICATION |
| ATTRIBUTE INFORMATION | USER NAME | USER A |
| | BANDWIDTH | 100Mbps |
| | CONNECTION LOCATION LIST | LOCATION X |
| | | LOCATION Z | a

Fig. 15

| RESOURCE ORDER (CHANGE) | | |
|---|---|---|
| ORDER TYPE: CHANGE | | |
| ORDER CONTENT: | | |
| IDENTIFIER | | VLAN ENDPOINT 2 |
| RESOURCE SPECIFICATION | | VLAN ENDPOINT SPECIFICATION |
| ATTRIBUTE INFORMATION | VLAN ID | 1234 |
| | BANDWIDTH | 100Mbps |
| | PHYSICAL PORT | PHYSICAL PORT 3 | a

Fig. 17

| MAPPING RULES | | | | | |
|---|---|---|---|---|---|
| SERVICE SPECIFICATION (MAPPING SOURCE) | RESOURCE SPECIFICATION (MAPPING TARGET) | NUMBER | SERVICE ATTRIBUTE (MAPPING SOURCE ATTRIBUTE) | RESOURCE ATTRIBUTE (MAPPING TARGET ATTRIBUTE) | VALUE DETERMINATION PROCESSING |
| VPN SERVICE SPECIFICATION | VLAN ENDPOINT SPECIFICATION | NUMBER OF "CONNECTION LOCATIONS" | USER NAME | VLAN ID | VLAN ID ALLOCATION |
| | | | BANDWIDTH | BANDWIDTH | ASSIGNMENT |
| | | | CONNECTION LOCATION LIST | PHYSICAL PORT | PHYSICAL PORT ALLOCATION |
| | VLAN PATH SPECIFICATION | 1 | USER NAME | VLAN ID | VLAN ID ALLOCATION |
| | | | BANDWIDTH | BANDWIDTH | ASSIGNMENT |
| | | | — | CONNECTION ENDPOINT LIST | RESOURCE REFERENCE (VLAN ENDPOINT SPECIFICATION) | a: SERVICE SPECIFICATION / RESOURCE SPECIFICATION / NUMBER
b: SERVICE ATTRIBUTE / RESOURCE ATTRIBUTE / VALUE DETERMINATION PROCESSING

Fig. 27

| RESOURCE ORDER | | |
|---|---|---|
| ORDER TYPE: CHANGE | | |
| ORDER CONTENT: | | |
| IDENTIFIER | | VLAN ENDPOINT 2 |
| RESOURCE SPECIFICATION | | VLAN ENDPOINT SPECIFICATION |
| ATTRIBUTE INFORMATION | VLAN ID | 1234 |
| | BANDWIDTH | 100Mbps |
| | PHYSICAL PORT | PHYSICAL PORT 3 |

NETWORK MANAGEMENT APPARATUS, METHOD, AND PROGRAM

CROSS-REFERENCE TO RELATED APPLICATIONS

This application is a National Stage application under 35 U.S.C. §371 of International Application No. PCT/JP2020/004975, having an International Filing Date of Feb. 7, 2020. The disclosure of the prior application is considered part of the disclosure of this application, and is incorporated by reference in its entirety into this application.

TECHNICAL FIELD

Embodiments of the present invention relate to a device, a method, and a program for network management.

BACKGROUND ART

Operation Support Systems (OSSs) require a function (hereinafter referred to as an order mapping function) of mapping between "an order to request a service (hereinafter referred to as a service order)" and an order to request a resource (hereinafter referred to as a resource order)" in order to loosely couple management functions and data between services provided to users over a network (e.g., VPN (Virtual Private Network) services) and resources for providing the services to the users (e.g., endpoints of VLANs (Virtual Local Area Networks), paths of VLANs).

The order mapping function is a function of, in response to a service order to request the creation of a service, the deletion of a service, and the change of a service (e.g., bandwidth change, connection location change), mapping between the service order and a resource order to request the creation, deletion, and change of a resource.

While conventional techniques have required an order mapping function developed for each type of service, there are techniques of generalizing the processing of mapping between a service order to request the creation of a service and a resource order, so that the reusability of the order mapping function can be improved and the cost and period for developing a system due to an increase in service types can be reduced (see, for example, PTL 1 and NPLs 1 to 3).

CITATION LIST

Patent Literature

[PTL 1] Japanese Patent Application Publication No. 2018-037982

Non Patent Literature

[NPL 1] TM Forum GB922, "Information Framework (SID): Service Overview Business Entities", Release 18.5.1, March 2019.
[NPL 2] TM Forum GB922, "Information Framework (SID): Physical Resource Business Entities", Release 18.0.1, October 2018.
[NPL 3] TM Forum GB922, "Information Framework (SID): Logical Resource and Compound Resource Business Entities", Release 18.5.1, March 2019.

SUMMARY OF THE INVENTION

Technical Problem

However, generalizing the processing of mapping between a service order to request the change of a service and a resource order cannot be realized by the above-mentioned techniques.

On the other hand, in order to reduce the cost and period for developing a system due to an increase in service types, it is desirable to generalize not only the processing of mapping between an order to request the creation and deletion of a service and a resource order but also the processing of mapping between an order to request the change of a service and a resource order.

The present invention has been made in view of the above circumstances, and an object of the present invention is to provide a device, a method, and a program for network management capable of reducing the cost and period required for developing a system due to an increase in service types.

Means for Solving the Problem

A network management device according to one aspect of the present invention is a network management device that maps between a service order to request a service on a network and a resource order to request a resource used for providing the service, and includes: a mapping rule storage device that stores mapping rules that define rules for the mapping between the service order and the resource order; a mapping history storage device that, when a mapping is performed based on the mapping rules, stores a mapping history in which an identifier of a service for the service order which is a mapping source, a type of a mapping rule used for the mapping, and an identifier of a resource for the resource order which is a mapping target are described; a first acquisition unit that, when a service order to change the service is created, acquires, from the mapping history and the identifier of the service to be changed, information indicating types of mapping rules to be used for mapping of the service order to change the service and the identifier of the resource for a resource order which is a mapping target; a second acquisition unit that acquires, from the mapping rules acquired by the first acquisition unit, a mapping rule affected by the change of the service in the service order to change the service; and a creation unit that creates a resource order by mapping of the service order to change the service based on the mapping rule acquired by the second acquisition unit.

A network management method according to one aspect of the present invention is a network management method performed by a network management device that maps between a service order to request a service on a network and a resource order to request a resource used for providing the service. The network management method includes: storing, in a mapping rule storage device, mapping rules that define rules for the mapping between the service order and the resource order; storing, in a mapping history storage, when a mapping is performed based on the mapping rules, a mapping history in which an identifier of a service for the service order which is a mapping source, a type of a mapping rule used for the mapping, and an identifier of a resource for the resource order which is a mapping target are described; acquiring, when a service order to change the service is created, from the mapping history and the identifier of the service to be changed, information indicating types of mapping rules to be used for mapping of the service order to change the service and the identifier of the resource for a resource order which is a mapping target; acquiring, from the acquired mapping rules, a mapping rule affected by the change of the service in the service order to change the service; and creating a resource order by mapping of the service order to change the service based on the acquired mapping rule.

Effects of the Invention

According to the present invention, it is possible to reduce the cost and period required for developing a system due to an increase in service types.

BRIEF DESCRIPTION OF DRAWINGS

FIG. 3 illustrates an example of service specification data held in a service specification holding unit in a table format.

FIG. 4 illustrates an example of service data held in a service data holding unit in a table format.

FIG. 5 illustrates an example of resource specification data for a physical port, held in a resource specification holding unit in a table format.

FIG. 6 illustrates an example of resource data for a physical port, held in a resource data holding unit in a table format.

FIG. 7 illustrates an example of resource specification data for a VLAN endpoint and a VLAN path, held in a resource specification holding unit in a table format.

FIG. 8 illustrates an example of resource data for a VLAN endpoint and a VLAN path, held in a resource data holding unit in a table format.

FIG. 9 illustrates an example of a service order for the creation of a service in a table format.

FIG. 10 illustrates an example of a resource order for the creation of a resource in a table format.

FIG. 11 illustrates an example of a service order for the deletion of a service in a table format.

FIG. 12 illustrates an example of a resource order for the deletion of a resource in a table format.

FIG. 13 illustrates an example of a service order for the change of a service in a table format.

FIG. 15 illustrates an example of a resource order for the change of a resource in a table format.

FIG. 17 illustrates an example of mapping rules held in a mapping rule holding unit in a table format.

FIG. 27 illustrates an example of a service order due to a connection location change in a service and a resource order associated with the service order.

DESCRIPTION OF EMBODIMENTS

Figure 1:
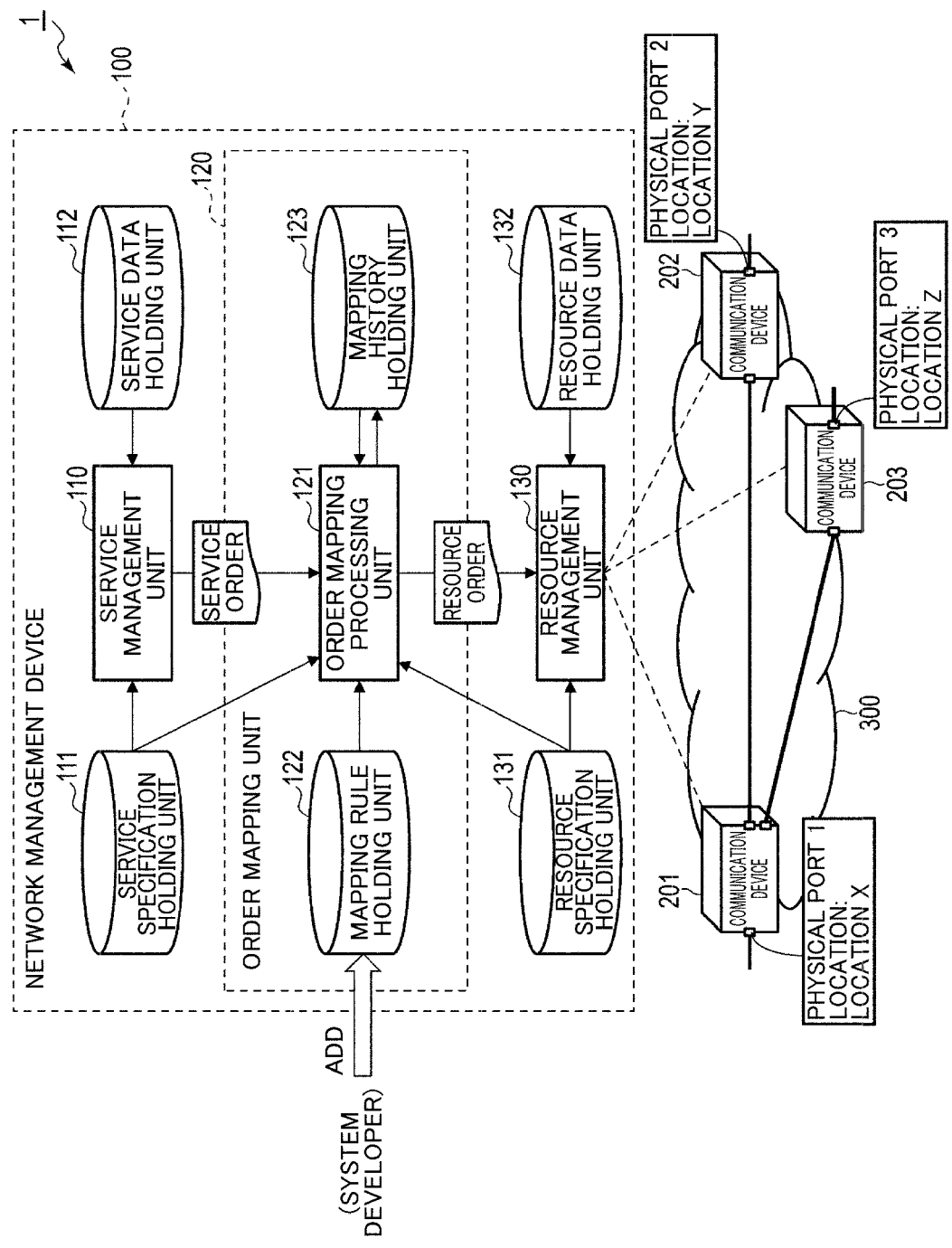
FIG. 1 is a diagram illustrating an application example of a network management device according to an embodiment of the present invention.

Embodiments according to the present invention will be described below with reference to the drawings. Note that, in the following embodiments, parts with the same reference numeral perform the same operation, and their repeated description will be omitted.

FIG. 1 is a diagram illustrating an application example of a network management device according to an embodiment of the present invention.

As illustrated in FIG. 1, a network management system 1 according to an embodiment of the present invention includes a network management device 100, and communication devices 201, 202, and 203. The communication devices 201, 202, and 203 are each general communication equipment for communications via a network 300.

In the example illustrated in FIG. 1, the communication device 201 is communicably connected to the communication devices 202 and 203.

One communication port on the side of the communication device 201 that is not connected to the communication devices 202 and 203 corresponds to a "physical port 1" installed at a "location X". One communication port on the side of the communication device 202 that is not connected to the communication devices 202 and 203 corresponds to a "physical port 2" installed at a "location Y". One communication port on the side of the communication device 203 that is not connected to the communication device 201 corresponds to a "physical port 3" installed at a "location Z".

The network management device 100 includes a service management unit 110, a service specification holding unit 111, a service data holding unit 112, an order mapping unit 120, a resource management unit 130, a resource specification holding unit 131, and a resource data holding unit 132.

The order mapping unit 120 includes an order mapping processing unit 121, a mapping rule holding unit 122, and a mapping history holding unit 123. Details of each unit will be described later.

Figure 2:
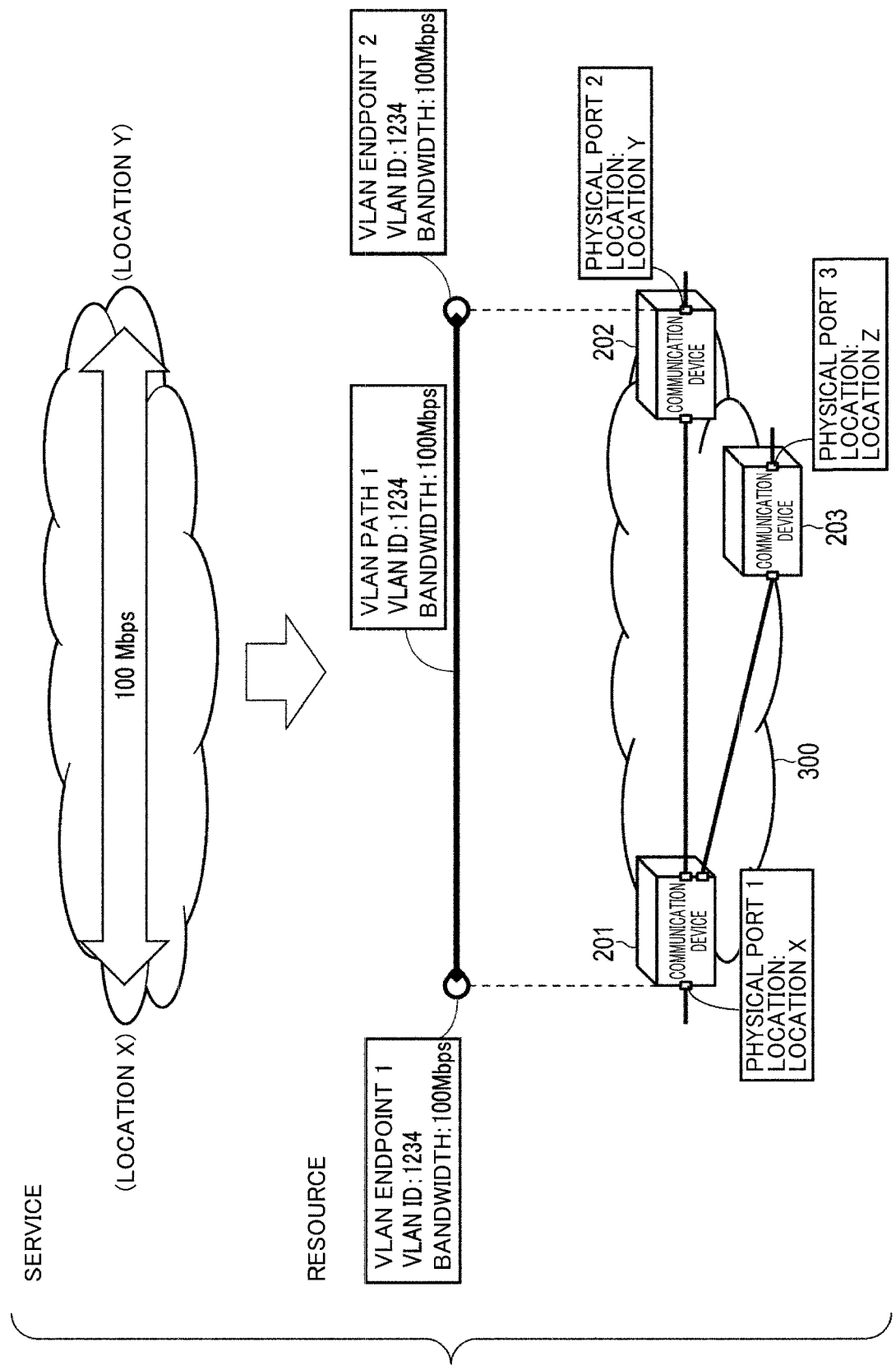
FIG. 2 is a diagram illustrating an example of creating a service provided to a user on a network and providing resources for providing the service.

FIG. 2 is a diagram illustrating an example of creating a service provided to a user on a network and providing resources for providing the service.

Here, as an example, a VPN service that provides communication between any locations, and resources required to provide this service will be described.

In the example illustrated in FIG. 2, the service is a VPN service for "user A", and is also a service with a bandwidth (communication speed) of 100 Mbps between location X and location Y.

In the example illustrated in FIG. 2, the resources include a "VLAN path 1" connecting a "VLAN endpoint 1" and a "VLAN endpoint 2". The "VLAN endpoint 1", "VLAN endpoint 2", and "VLAN path 1" have "VLAN ID: 1234" and "bandwidth: 100 Mbps" as attribute information. In the example illustrated in FIG. 2, the "VLAN endpoint 1" corresponds to the "physical port 1" and the "VLAN endpoint 2" corresponds to the "physical port 2".

Next, an example of data held in the service specification holding unit 111 and the service data holding unit 112 will be described. FIG. 3 illustrates an example of service specification data held in the service specification holding unit in a table format.

As illustrated in FIG. 3, the service specification holding unit 111 holds service specification data representing a specification of a certain service type.

The service specification data includes, as basic information, an identifier for uniquely identifying the service specification (sometimes referred to as a service specification identifier). The service specification data also includes, as attribute information, attribute information that defines the service.

As illustrated in FIG. 3, there is service specification data for the service as illustrated in FIG. 2.

In the service specification data illustrated in FIG. 3, the service specification identifier is "VPN Service Specification", and the attribute information is "User Name", "Bandwidth", and "Connection Location List".

FIG. 4 illustrates an example of service data held in the service data holding unit in a table format.

As illustrated in FIG. 4, the service data holding unit 112 holds service data created based on a certain service specification. The service data includes, as basic information, an identifier for uniquely identifying the service (sometimes referred to as a service identifier) and an identifier of the service specification to be referred to.

The service data also includes, as attribute information, values for pieces of attribute information (e.g., user name, bandwidth, connection location list) defined in the service specification data to be referred to.

As illustrated in FIG. 4, there is service data for each service as illustrated in FIG. 2.

In the service data illustrated in FIG. 4, the service identifier is "VPN Service 1", and the identifier of the service specification to be referred to is "VPN Service Specification" illustrated in FIG. 3.

In this service data, the user name in the attribute information is "user A" to which the service illustrated in FIG. 2 is to be provided, the bandwidth in the attribute information is "100 Mbps" illustrated in FIG. 2, and the connection location list in the attribute information includes "location X" and "location Y" illustrated in FIG. 2.

Next, an example of data held in the resource specification holding unit 131 and the resource data holding unit 132 will be described.

The resource specification holding unit 131 holds resource specification data representing specifications of a certain resource type. The resource data holding unit 132 holds resource data based on a certain resource specification.

Next, of the data held in the resource specification holding unit 131 and the resource data holding unit 132, data for the physical port illustrated in FIG. 2 will be described. FIG. 5 illustrates an example of resource specification data for a physical port, held in the resource specification holding unit in a table format. As illustrated in FIG. 5, there is the resource specification data for the physical port.

As illustrated in FIG. 5, the resource specification (resource type) data includes, as basic information, an identifier for uniquely identifying the resource specification (sometimes referred to as a resource specification identifier). The resource specification data also includes, as attribute information, at least one piece of attribute information that defines the resource.

In the resource specification data for the physical port illustrated in FIG. 5, the resource specification identifier is "Physical Port Specification" and the attribute information is "Installation Location".

FIG. 6 illustrates an example of resource data for a physical port, held in the resource data holding unit in a table format.

As illustrated in FIG. 6, the resource data includes, as basic information, an identifier for uniquely identifying the resource (sometimes referred to as a resource identifier) and an identifier of the resource specification to be referred to. The resource data also includes, as attribute information, a value for the attribute information defined in the resource specification to be referred to.

In the resource data for the physical port illustrated in FIG. 6, the attribute information is "Installation Location" illustrated in FIG. 5.

As illustrated in FIG. 6, there is resource data for each physical port illustrated in FIG. 2.

In the resource data for the "physical port 1" illustrated in FIG. 2, as illustrated in FIG. 6, the resource identifier is "Physical Port 1", and the identifier of the resource specification to be referred to is "Physical Port Specification" illustrated in FIG. 5. In this resource data, the installation location in the attribute information is the "location X" illustrated in FIG. 2.

In the resource data for the "physical port 2" illustrated in FIG. 2, as illustrated in FIG. 6, the resource identifier is "Physical Port 2", and the identifier of the resource specification to be referred to is "Physical Port Specification". In this resource data, the installation location in the attribute information is "Location Y" illustrated in FIG. 2.

Further, although not illustrated, similarly, there is also resource data for the "physical port 3" illustrated in FIG. 2.

Next, of the data held in the resource specification holding unit 131 and the resource data holding unit 132, data for the VLAN endpoint and the VLAN path illustrated in FIG. 2 will be described.

FIG. 7 illustrates an example of resource specification data for a VLAN endpoint and a VLAN path, held in a resource specification holding unit in a table format.

As illustrated in FIG. 7, there are resource specification data for the VLAN endpoint and resource specification data for the VLAN path.

In the resource specification data for the VLAN endpoint, the resource specification identifier is "VLAN Endpoint Specification", and the attribute information includes "VLAN ID", "Bandwidth", and "Physical Port".

Further, in the resource specification data for the VLAN path, the resource specification identifier is "VLAN Path Specification", and the attribute information includes "VLAN ID", "Bandwidth", and "Connection Endpoint List".

FIG. 8 illustrates an example of resource data for a VLAN endpoint and a VLAN path, held in the resource data holding unit in a table format.

As illustrated in FIG. 8, there are resource data for each VLAN endpoint illustrated in FIG. 2 and resource data for the VLAN path illustrated in FIG. 2.

In the resource data for the VLAN endpoint, the attribute information includes "VLAN ID", "Bandwidth", and "Physical Port" in the resource specification data for the VLAN endpoint illustrated in FIG. 7.

Further, in the resource data for the VLAN path, the attribute information includes "VLAN ID", "Bandwidth", and "Connection Endpoint List" in the resource specification data for the VLAN path illustrated in FIG. 7.

In the resource data for "VLAN Endpoint 1" illustrated in FIG. 8, the resource identifier is "VLAN Endpoint 1" as it is, and the resource specification identifier to be referred to is "VLAN Endpoint Specification" in the resource specification data for the VLAN endpoint illustrated in FIG. 7.

In this resource data, "VLAN ID" in the attribute information is "1234" illustrated in FIG. 2, "Bandwidth" in the attribute information is "100 Mbps" illustrated in FIG. 2, and "Physical Port" in the attribute information is the "physical port 1" illustrated in FIG. 2.

Further, although not illustrated, similarly, there is also resource data for the "VLAN endpoint 2" illustrated in FIG. 2.

Further, in the resource data for "VLAN Path 1" illustrated in FIG. 8, the resource identifier is "VLAN Path 1" as it is, and the resource specification identifier to be referred to is "VLAN Path Specification" in the resource specification data for the VLAN path illustrated in FIG. 7.

In this resource data, "VLAN ID" in the attribute information is "1234" illustrated in FIG. 2, "Bandwidth" in the attribute information is "100 Mbps" illustrated in FIG. 2, and "Connection Endpoint List" in the attribute information includes the "VLAN endpoint 1" and the "VLAN endpoint 2" illustrated in FIG. 2.

In other words, the resource data illustrated in FIGS. 6 and 8 describes (1) the relationship between the physical ports and the installation locations of the physical ports illustrated in FIG. 2; (2) the relationship between the physical ports and the VLAN endpoints illustrated in FIG. 2; and (3) the relationship between the VLAN endpoints and the VLAN path illustrated in FIG. 2.

Next, an example of the service order and the resource order will be described. First, an order for the creation of a service or a resource will be described. FIG. 9 illustrates an example of a service order for the creation of a service in a table format. FIG. 10 illustrates an example of a resource order for the creation of a resource in a table format.

The service order and the resource order each include an order type and an order content. The order type describes "Create", "Change", or "Delete" as the type of the order, and the order content describes the specific content of the order.

For a service order for creation, the order type specifies "Create", and the order content describes (1) the identifier of the service to be created, (2) the identifier of the service specification to be referred to, and (3) the attribute information.

In the example illustrated in FIG. 9, the content of the service order for creation includes the same identifier and attribute information as the service data illustrated in FIG. 4.

For a resource order for creation, the order type specifies "Create", and the order content describes (1) the identifier of the resource to be created, (2) the identifier of the resource specification to be referred to, and (3) the attribute information.

In the example illustrated in FIG. 10, the content of the resource order for creation is the content of the resource order for the "VLAM endpoint 2" illustrated in FIG. 2. In this order content, the resource identifier is "VLAN Endpoint 2", and the identifier of the resource specification to be referred to is "VLAN Endpoint Specification" in the resource specification illustrated in FIG. 7.

In this order content, VLAN ID in the attribute information is "1234" illustrated in FIG. 2, Bandwidth in the attribute information is "100 Mbps" illustrated in FIG. 2, and Physical Port in the attribute information is the "physical port 2" illustrated in FIG. 2, which are the same as the resource data for "VLAM Endpoint 2".

The resource order illustrated in FIG. 10 is the resource order for the "VLAM endpoint 2", while, in addition to this, there are a resource order for the "VLAM endpoint 1" illustrated in FIG. 2 and a resource order for the "VLAM path 1" illustrated in FIG. 2.

Next, an order for the deletion of a service or a resource will be described. FIG. 11 illustrates an example of a service order for the deletion of a service in a table format. FIG. 12 illustrates an example of a resource order for the deletion of a resource in a table format.

In the order for deletion, the order type specifies "Delete", and the order content describes data on (1) the identifier of the service or resource to be deleted, (2) the identifier of the service specification or resource specification to be referred to, and (3) the attribute information.

In the example illustrated in FIG. 11, the content of the service order for deletion is the same as the content illustrated in FIG. 9. However, the others, i.e., the service specification identifier and attribute information enclosed by a illustrated in FIG. 11 do not have to be included in the service order for deletion. This is because the service order for deletion only needs to have the identifier for uniquely identifying the service to be deleted.

In the example illustrated in FIG. 12, the content of the resource order for deletion is the same as the content illustrated in FIG. 10. However, the others, i.e., the resource specification identifier and attribute information enclosed by a illustrated in FIG. 12 do not have to be included in the resource order for deletion. This is because the resource order for deletion only needs to have the identifier for uniquely identifying the resource to be deleted.

Figure 14:
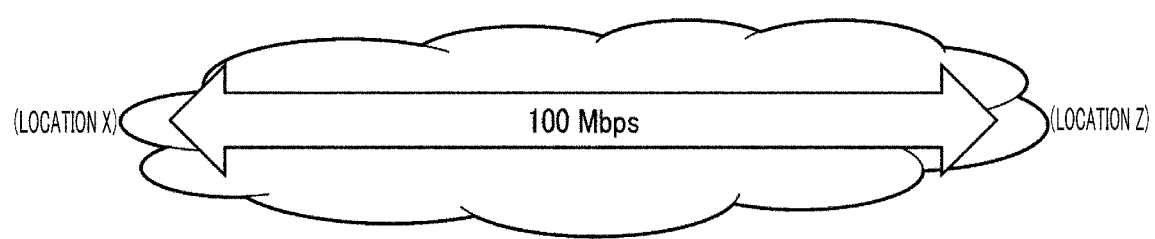
FIG. 14 is a diagram illustrating an example of the change of a service.
Figure 16:
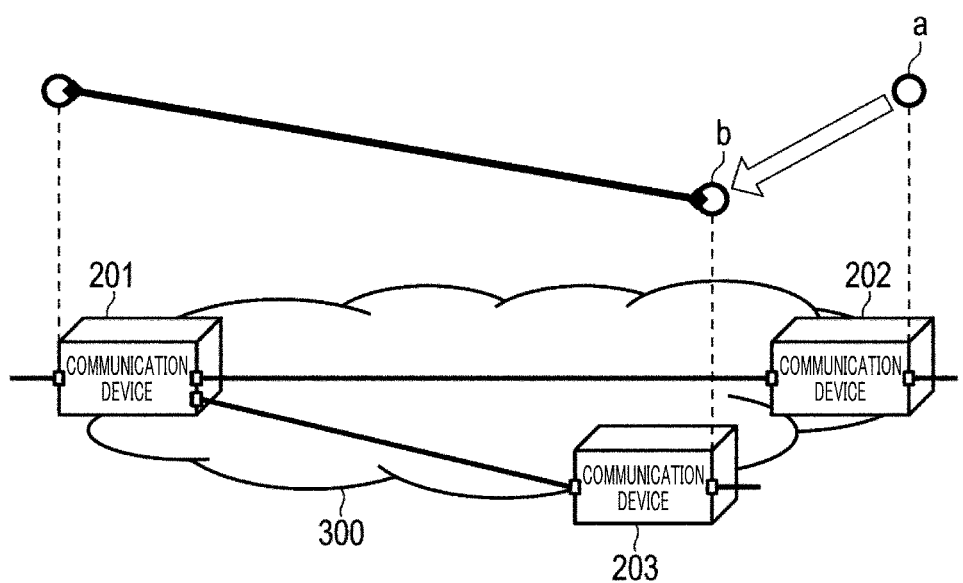
FIG. 16 is a diagram illustrating an example of the change of a resource.

Next, an order for the change of a service or a resource will be described. FIG. 13 illustrates an example of a service order for the change of a service in a table format. FIG. 14 is a diagram illustrating an example of the change of a service. FIG. 15 illustrates an example of a resource order for the change of a resource in a table format. FIG. 16 is a diagram illustrating an example of the change of a resource.

In the order for change, the order type specifies "Change", and the order content describes data on (1) the identifier of the service or resource to be changed, (2) the identifier of the service specification or resource specification to be referred to, and (3) the attribute information.

In the example illustrated in FIG. 13, the content of the service order for change is changed as follows, as compared with the content illustrated in FIG. 9. Specifically, "Location Y" in the connection location list in the attribute information is changed to "Location Z" as illustrated in FIGS. 13 and 14. This change from "Location Y" to "Location Z" is the change in the service order.

Note that the service order for change only needs to include the identifier for uniquely identifying the service to be changed and information about a part to be changed in the service order. Therefore, the others, i.e., unchanged information enclosed by a illustrated in FIG. 13, the service specification identifier by way of example here, and unchanged attribute information by way of example here do not have to be included in the service order for change.

In the example illustrated in FIG. 15, the content of the resource order for change is changed as follows, as compared with the content illustrated in FIG. 10. Specifically, "Physical Port 2" which is the physical port in the attribute information is changed to "Physical Port 3" as illustrated in FIGS. 15 and 16. This change from "Physical Port 2" to "Physical Port 3" is a part to be changed in the resource order.

Note that the resource order for change only needs to include the identifier for uniquely identifying the resource to be changed and information about a part to be changed in the resource order. Therefore, the others, i.e., unchanged information enclosed by a illustrated in FIG. 15, the resource specification identifier by way of example here, and unchanged attribute information by way of example here do not have to be included in the resource order for change.

Next, an example of data held in the mapping rule holding unit 122 will be described.

FIG. 17 illustrates an example of mapping rules held in the mapping rule holding unit in a table format.

The mapping rule holding unit 122 holds mapping rules for determining the resource specifications, the numbers, and the attribute values of resources required to create a service of each service specification. Based on the mapping rules, a resource order corresponding to a service order is created.

As illustrated in FIG. 17, the mapping rules includes (1) an identifier for uniquely identifying a service specification which is a mapping source: "service specification (mapping source)", (2) an identifier for uniquely identifying a resource specification which is a mapping target: "resource specification (mapping target)", (3) the number of resources which are mapping targets, (4) a service attribute which is an attribute of the mapping source: "service attribute (mapping source attribute)", (5) a resource attribute which is an attribute of the mapping target: "resource attribute (mapping target attribute)", and (6) the name of value determination processing: "value determination processing", which are associated with each other.

In the mapping rules, the resource specification which is a mapping target and the number of resources which are mapping targets, which are indicated by a in FIG. 17, are rules for determining the identification name of a resource specification and the number of the resources for resources required to create a service.

In the mapping rules, the service attribute which is an attribute of the mapping source, the resource attribute which is an attribute of the mapping target, and the name of value determination processing, which are indicated by b in FIG. 17, are rules for determining the values of the attribute information in the resource specification data for each resource.

In the example illustrated in FIG. 17, the service specification which is the mapping source defines "VPN Service Specification" in the service specification illustrated in FIG. 3.

Further, the resource attribute which is an attribute of the mapping target defines "VLAN Endpoint Specification" and "VLAN Path Specification" in the resource specification illustrated in FIG. 7.

In other words, in the example illustrated in FIG. 17, a mapping rule from the service specification "VPN Service Specification" to the resource specification "VLAN Endpoint Specification" and a mapping rule from the service specification "VPN Service Specification" to the resource specification "VLAN Path Specification" are defined.

For this "VLAN Endpoint Specification", the number of resources which are mapping targets is the "Number of Connection Locations", the service attributes which are attributes of the mapping source are "User Name", "Bandwidth", and "Connection Location List", and the resource attributes which are attributes of the mapping target are "VLAN ID", "Bandwidth", and "Physical Port".

The name of value determination processing for that "VLAN ID" is "VLAN ID Allocation", the name of value determination processing for the bandwidth is "Assignment", and the name of value determination processing for the physical port is "Physical Port Allocation".

For the above "VLAN Path Specification", the number of resources which are mapping targets is "1", the service attributes which are attributes of the mapping source are "User Name" and "Bandwidth", and the resource attributes which are attributes of the mapping target are "VLAN ID", "Bandwidth", and "Connection Endpoint List". The name of value determination processing for that "VLAN ID" is "VLAN ID Allocation", the name of value determination processing for the bandwidth is "Assignment", and the name of value determination processing for the connection endpoint list is "Resource Reference (VLAN Endpoint Specification)".

The meaning of the above value determination processing is as follows.

VLAN ID allocation: Determine a unique VLAN ID using the value of "service attribute" as a key to set the value of "resource attribute" to the VLAN ID.

Assignment: Set the value of "resource attribute" to the value of "service attribute".

Physical port allocation: Set the value of the "resource attribute" to the identifier of the physical port whose "installation location" is the value of the "service attribute".

Resource reference: Set the value of the "resource attribute" to the resource of the specification in ( ) created in the mapping.

In the present embodiment, for the resource illustrated in FIG. 2, an internal memory of the order mapping unit 120 holds the following information (1) to (3) indicating the correspondence between elements in a resource (sometimes referred to as resource configuration information).

(1) Information indicating the relationship between the identification information of a physical port and the identification information of a location where the physical port is installed.

(2) Information indicating the relationship between the identification information of a physical port and the identification information of a VLAN endpoint corresponding to the physical port.

(3) Information indicating the relationship between the identification information of a plurality of VLAN endpoints and the identification information of a VLAN path including these VLAN endpoints.

In the example illustrated in FIG. 2, the above information (1) is the following (1-1) to (1-3).
(1-1) Information indicating that the "physical port 1" corresponds to the "location X"
(1-2) Information indicating that the "physical port 2" corresponds to the "location Y"
(1-3) Information indicating that the "physical port 3" corresponds to the "location Z"

In the example illustrated in FIG. 2, the above information (2) is the following (2-1) and (2-2).
(2-1) Information indicating that the "physical port 1" corresponds to the "VLAN endpoint 1"
(2-2) Information indicating that the "physical port 2" corresponds to the "VLAN endpoint 2"

In the example illustrated in FIG. 2, the above information (3) is the following (3-1).
(3-1) Information indicating that one end of the "VLAN path 1" is the "VLAN endpoint 1" and the other end of the "VLAN path 1" is the "VLAN endpoint 2"

Based on the above resource configuration information and the above mapping rules, a resource order corresponding to a service order can be created.

For example, for the service order illustrated in FIG. 9, (1) a resource order for "VLAN Endpoint 1" that has as the order content the resource data for "VLAN Endpoint 1" illustrated in FIG. 8 and has "Create" as the order type, and (1) a resource order for "VLAM Endpoint 2" illustrated in FIG. 10 can be created as a resource order for "VLAN Endpoint Specification" in the mapping rules illustrated in FIG. 17.

Further, for the service order illustrated in FIG. 9, a resource order for "VLAN Path 1" that has as the order content the resource data for "VLAN Path 1" illustrated in FIG. 8 and "Create" as the order type can be created as a resource order for "VLAN Path Specification" in the mapping rules illustrated in FIG. 17.

Next, an example of data held in the mapping history holding unit 123 will be described.

Figure 18:
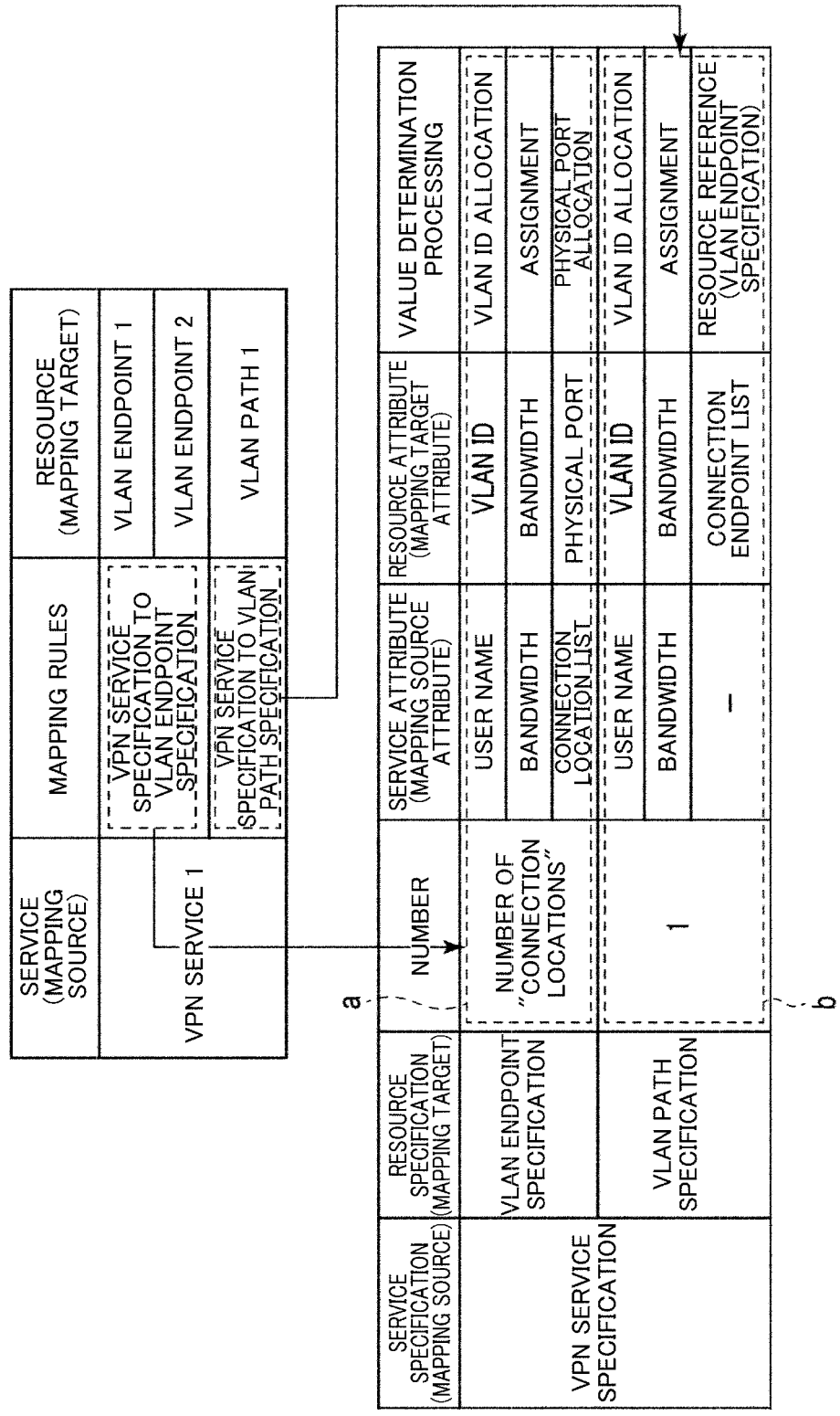
FIG. 18 illustrates an example of a mapping history held in a mapping history holding unit in a table format.

FIG. 18 illustrates an example of a mapping history held in the mapping history holding unit in a table format.

The mapping history holding unit 123 holds a mapping history indicating which mapping rule was used to create which resource when a service was created.

In the example illustrated in FIG. 18, the mapping history holding unit 123 holds (1) an identifier for uniquely identifying a service which is the mapping source, generated by a service order, (2) information indicating the mapping source and mapping target of a mapping rule used when mapping between the service order and a resource order is made (sometimes referred to as a mapping rule type), and (3) an identifier for uniquely identifying a resource which is mapping target, generated by the resource order.

In the example illustrated in FIG. 18, "VPN Service 1" illustrated in FIG. 4 is stored in the identifier for uniquely identifying a service which is the mapping source, generated by the service order, in the mapping history.

In the example illustrated in FIG. 18, the mapping rules used in the mapping history include (1) a mapping rule type "VPN Service Specification to VLAN Endpoint Specification" indicating a mapping rule from "VPN Service Specification" to "VLAN Endpoint Specification", and (2) a mapping rule type "VPN Service Specification to VLAN Path Specification" indicating that a mapping rule from "VPN Service Specification" to "VLAN Path Specification".

The mapping rule corresponding to the mapping rule type "VPN Service Specification to VLAN Endpoint Specification" is a rule enclosed by a in FIG. 18, and the mapping rule corresponding to "VPN Service Specification to VLAN Path Specification" is a rule enclosed by b in FIG. 18.

For the above mapping rule type "VPN Service Specification to VLAN Endpoint Specification", the identifiers for uniquely identifying the resources which are mapping targets, generated by the resource order, are the "VLAN endpoint 1" and the "VLAN endpoint 2" illustrated in FIG. 2.

For the above mapping rule type "VPN Service Specification to VLAN Path Specification", the identifier for uniquely identifying the resource which is a mapping target, generated by the resource order, is the "VLAN path 1" illustrated in FIG. 2.

Figure 19:
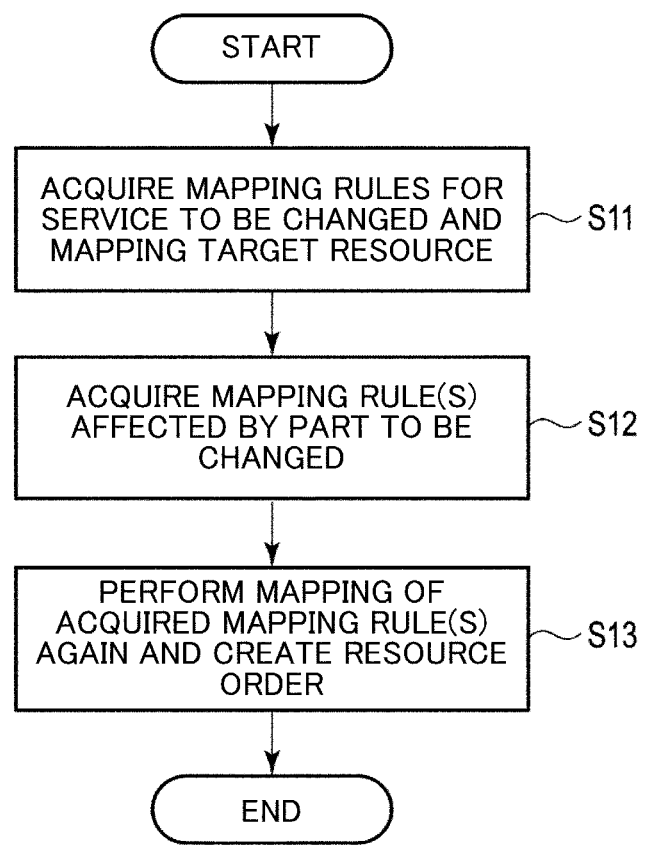
FIG. 19 is a flow chart illustrating an example of the operation of an order mapping processing unit.

Next, an example of the processing operation by the order mapping processing unit 121 will be described. FIG. 19 is a flow chart illustrating an example of the operation of the order mapping processing unit.

First, the order mapping processing unit 121, which serves as a first acquisition unit, acquires the types of mapping rules and the identifiers of mapping target resources for a service to be changed (S11).

Next, the order mapping processing unit 121, which also serves as a second acquisition unit, acquires a mapping rule that is affected by a part to be changed in the service (S12).

Next, the order mapping processing unit 121, which also serves as a creation unit, creates a resource order by performing mapping again using the mapping rule acquired in S12 (S13).

In S13, when the "number" of resources is changed (increased or reduced), the order mapping processing unit 121 creates a resource order for creation (when the number of resources is increased) or a resource order for deletion (when the number of resources is reduced).

Further, in S13, when the attribute value of the resource is changed, the order mapping processing unit 121 creates a resource order for change.

In S13, when a new resource is created or deleted after mapping, the order mapping processing unit 121 updates the mapping history to hold only the latest mapping history.

Figure 20:
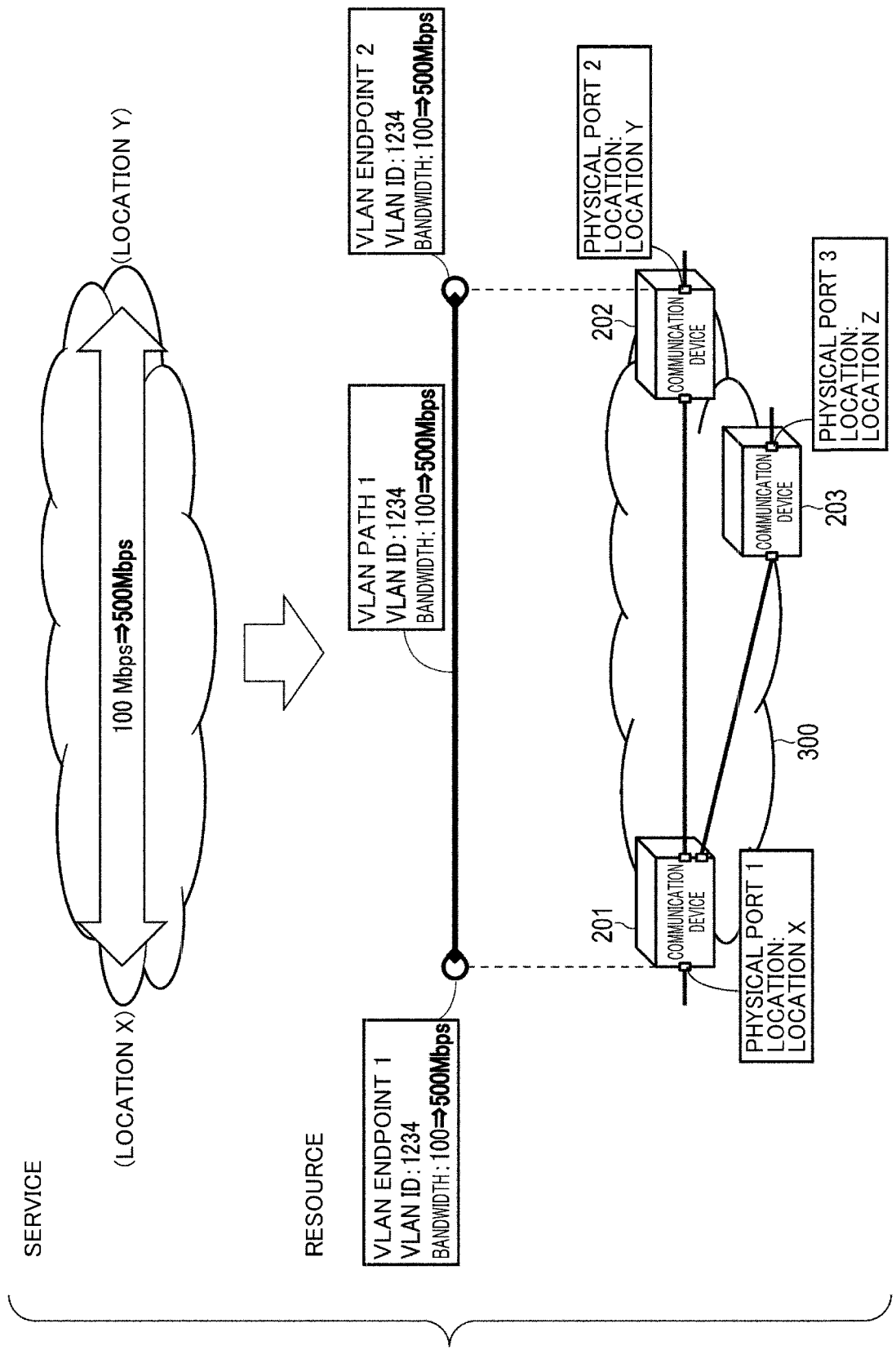
FIG. 20 is a diagram illustrating an example of the change of a resource due to a bandwidth change in a service.

Next, a specific example of processing for the change of a service will be described. First, processing for a bandwidth change in a service will be described. FIG. 20 is a diagram illustrating an example of the change of a resource due to the bandwidth change in the service.

The example illustrated in FIG. 20 indicates that the bandwidth for the service to be provided is changed from 100 Mbps illustrated in FIG. 2 to 500 Mbps, and with this change, the bandwidth on the VLAN endpoint 1, the VLAN endpoint 2, and the VLAN path 1, which are the resources, is changed from 100 Mbps illustrated in FIG. 2 to 500 Mbps.

Figure 21:
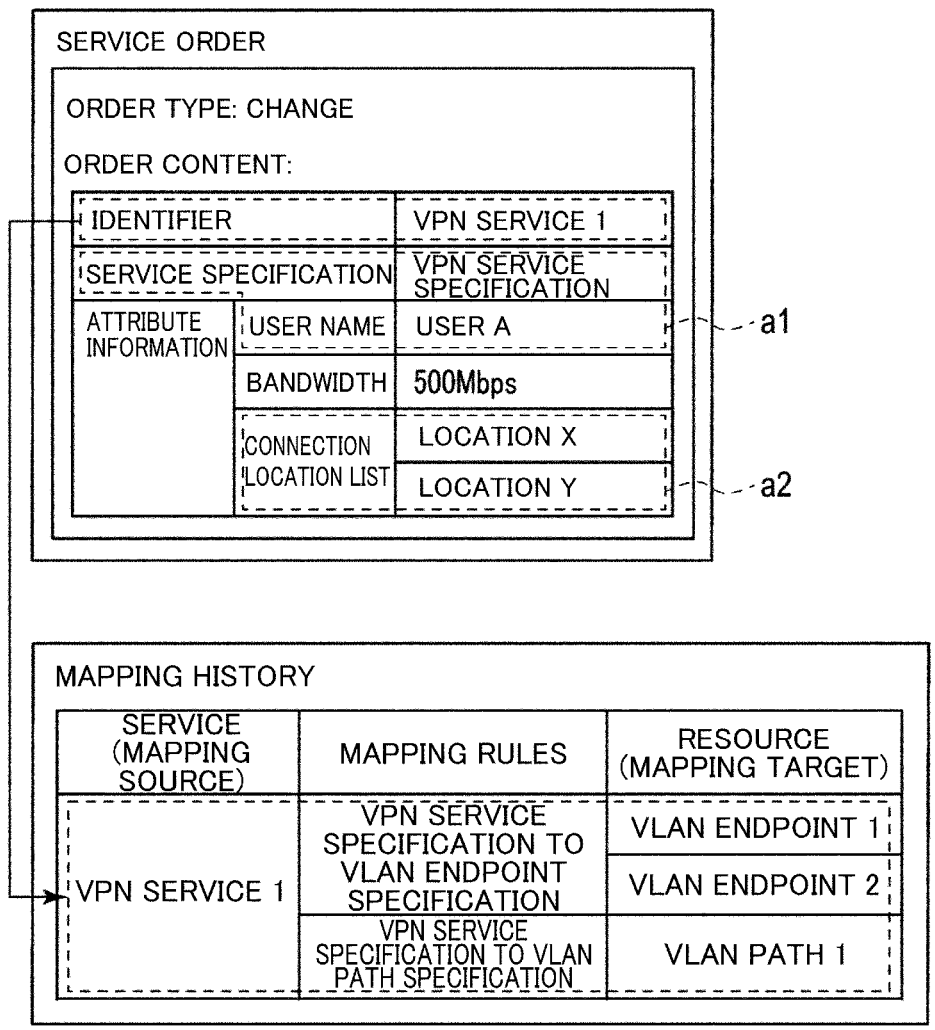
FIG. 21 illustrates an example of a service order due to a bandwidth change in a service and a mapping history associated with the service order.

FIG. 21 illustrates an example of a service order due to a bandwidth change in a service and a mapping history associated with the service order.

As illustrated in FIG. 20, when the bandwidth is changed, as illustrated in FIG. 21, the service order is changed from 100 Mbps to 500 Mbps as compared with FIG. 9. Note that the parts enclosed by a1 and a2 illustrated in FIG. 21 except for the service identifier have the same contents as those before the change.

In this example, as S11, the order mapping processing unit 121 receives the service order subjected to the change illustrated in FIG. 20 from the service management unit 110.

The order mapping processing unit 121 identifies the identifier "VPN Service 1" for uniquely identifying the service in the received service order, and identifies the same identifier "VPN Service 1" set in the "service (mapping source)" in the mapping history.

Then, the order mapping processing unit 121 identifies (1) the first mapping rule type "VPN Service Specification to VLAN Endpoint Specification" associated with the identified "VPN Service 1" in the mapping history, and (2) the identifiers "VLAM Endpoint 1" and "VLAN Endpoint 2" of the resources which are mapping targets, associated with that type.

Further, the order mapping processing unit 121 identifies (1) the second mapping rule type "VPN Service Specification to VLAN Path Specification" associated with the identified identifier "VPN Service 1" of the service which is a mapping source in the mapping history, and (2) the identifier "VLAM Path 1" of the resource which is a mapping target, associated with that type.

Figure 22:
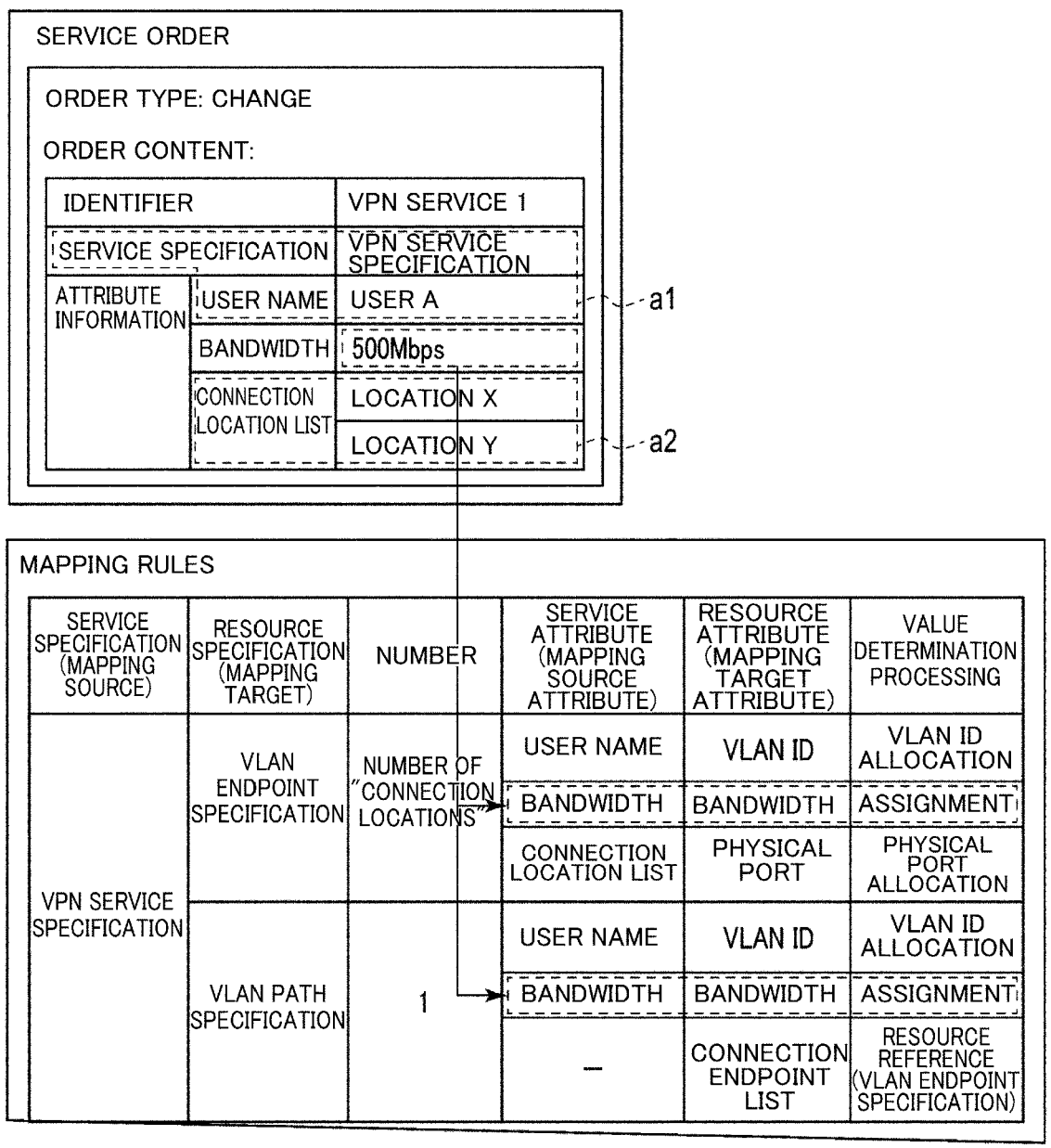
FIG. 22 illustrates an example of a service order due to a bandwidth change in a service and mapping rules associated with the service order.

FIG. 22 illustrates an example of a service order due to a bandwidth change in a service and mapping rules associated with the service order.

After the above identification, in S12, the order mapping processing unit 121 identifies the "bandwidth" (500 Mbps) in the attribute information which is a part to be changed in the received service order.

Then, the order mapping processing unit 121 identifies (1) the above-identified "bandwidth" among the service attributes associated with the first resource specification "VLAN Endpoint Specification" in the mapping rules, (2) the resource isomerism "bandwidth" associated with that service attribute, and (3) the value determination processing "assignment" associated with that resource attribute.

Similarly, in S12, the order mapping processing unit 121 identifies (1) the service attribute "bandwidth" which is associated with the second resource specification "VLAN Path Specification" in the mapping rules, (2) the resource isomerism "bandwidth" associated with that service attribute, and (3) the value determination processing "assignment" associated with that resource attribute.

This identification indicates that, when the value of the attribute "bandwidth" in the service order is changed, the value of the attribute "bandwidth" in the resource order is changed.

In the above identification, the mapping rules affected by the part to be changed in the service are identified to be the mapping rule for the mapping target "VLAN Endpoint Specification" and the mapping rule for the mapping target "VLAN Path Specification".

Figure 23:
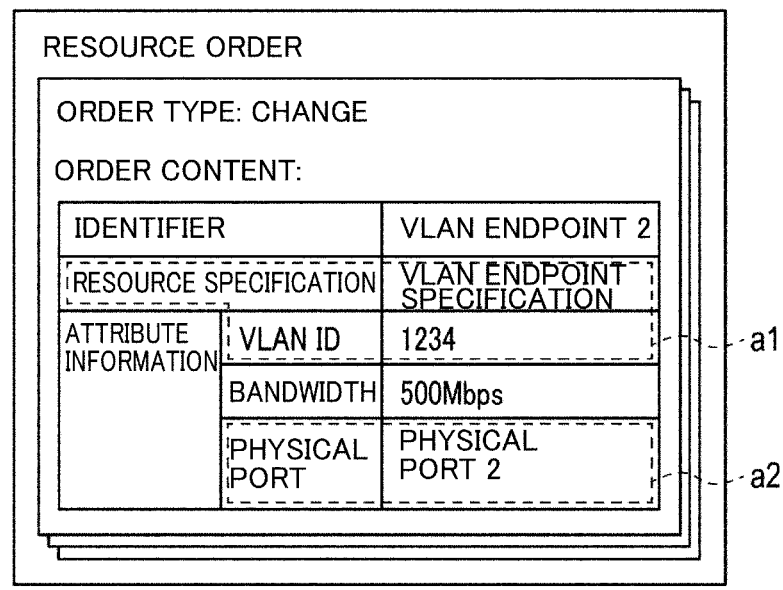
FIG. 23 illustrates an example of a service order due to a bandwidth change in a service and a resource order associated with the service order.

FIG. 23 illustrates an example of a service order due to a bandwidth change in a service and a resource order associated with the service order.

After the above identification, in S13, the order mapping processing unit 121 creates a changed resource order by mapping from the changed service order to the resource order using the mapping rule(s) identified in S12.

The resource orders having the resource attribute "bandwidth" identified in S12 as attribute information are (1) a resource order in which "VLAN Endpoint 1" is set as the resource identifier in the order content, (2) a resource order in which "VLAN Endpoint 2" is set as the resource identifier in the order content, and (3) a resource order in which "VLAN Path 1" is set as the resource identifier in the order content, which are resource orders to be changed.

Then, the service attribute identified in S12 is "Bandwidth", the resource attribute identified in S12 is "Bandwidth", and the value determination processing identified in S12 is "Assignment". Accordingly, for example, as illustrated in FIG. 23, the bandwidth "500 Mbps" of the attribute information in the changed service order is assigned to the bandwidth value of the attribute information in the resource order for the first change target, resource identifier "VLAN Endpoint 2". In this resource order, other contents enclosed by a1 and a2 in FIG. 23 are the same as those before the change.

Similarly, the attribute information bandwidth "500 Mbps" in the changed service order is assigned to each of the bandwidth value of the attribute information in the resource order for the second change target, resource identifier "VLAN Endpoint 1" and the bandwidth value of the attribute information in the resource order for the third change target, resource identifier "VLAN Path 1".

As described above, the information indicating that the resource orders to be changed are the resource orders for "VLAN Endpoint 1", "VLAN Endpoint 2", and "VLAN Path 1" is acquired by using the mapping history and the mapping rules.

In other words, the resources used by the service to be changed are acquired based on the mapping history (p. 17), and the mapping rule(s) using the attribute value to be changed, that is, affected by the part to be changed in the service are acquired from the mapping rules for the service to be changed (p. 18).

The resource order created by the mapping rule(s) is to be changed. The order of S11 and S12 may be reversed.

Figure 24:
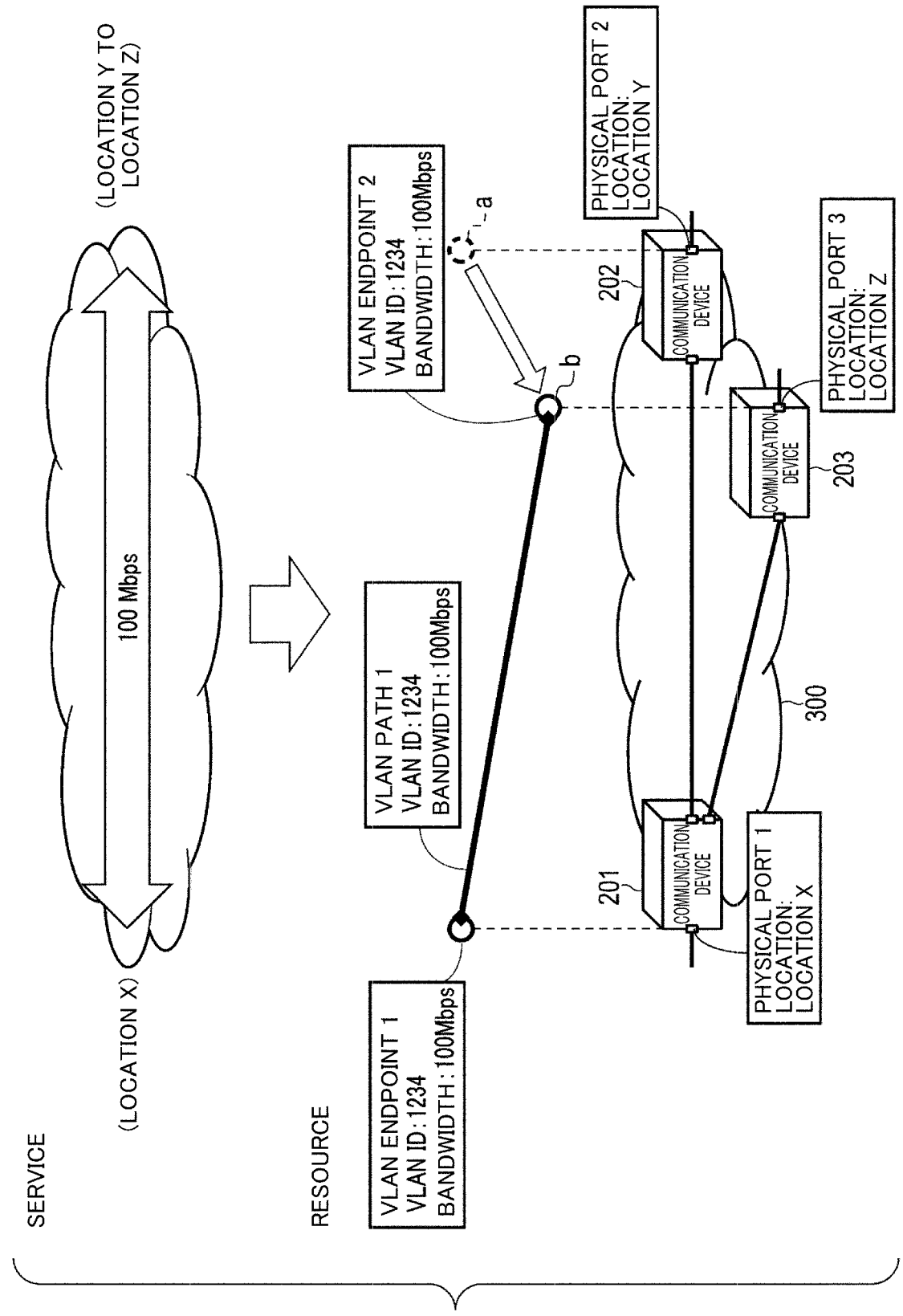
FIG. 24 is a diagram illustrating an example of the change of a resource due to a connection location change in a service.

First, processing for a connection location change in a service will be described. FIG. 24 is a diagram illustrating an example of the change of a resource due to the connection location change in the service.

The example illustrated in FIG. 24 indicates that the connection location for a service to be provided is changed from the location Y to the location Z illustrated in FIG. 2, and with this change, the physical port corresponding to the VLAN endpoint 2 is changed from the "physical port 2" installed at the "location Y" illustrated in FIG. 2 to the "physical port 3" installed at the "location Z".

In the above change, in the above resource configuration information, it is assumed that the information indicating that the "physical port 2" corresponds to the "VLAN endpoint 2" is changed to the information indicating that the "physical port 3" corresponds to the "VLAN endpoint 2".

Figure 25:
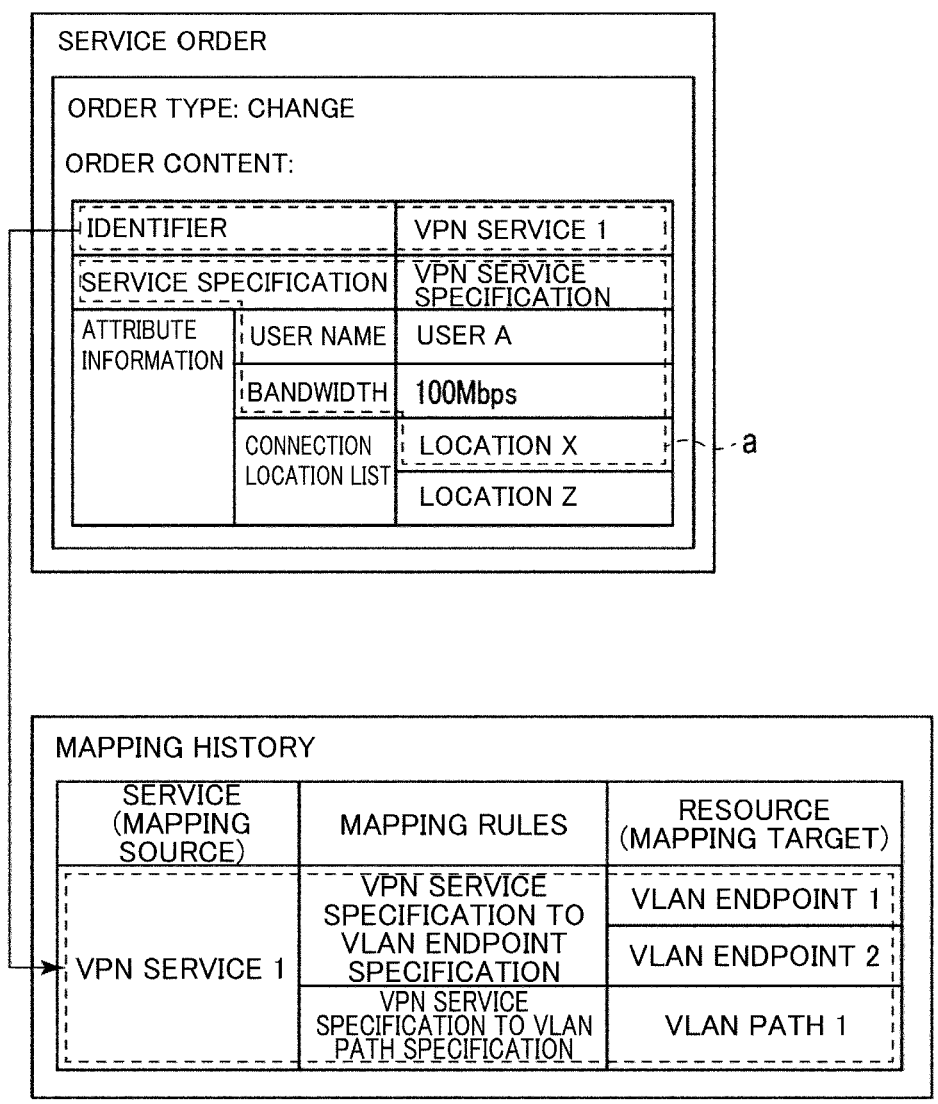
FIG. 25 illustrates an example of a service order due to a connection location change in a service and a mapping history associated with the service order.

FIG. 25 illustrates an example of a service order due to the connection location change in a service and a mapping history associated with the service order.

When the connection location is changed as illustrated in FIG. 24, as illustrated in FIG. 25, the connection location in the service order is changed from the "location Y" to the "location Z" as compared with FIG. 9. Note that the part enclosed by a illustrated in FIG. 25 except for the service identifier has the same content as that before the change.

In this example, as S11, the order mapping processing unit 121 receives the service order subjected to the change illustrated in FIG. 24 from the service management unit 110.

As in the above-described bandwidth change, the order mapping processing unit 121 identifies (1) the same identifier "VPN Service 1" as that set in the "service (mapping source)" in the mapping history, (2) the first mapping rule type "VPN Service Specification to VLAN Endpoint Specification", (3) the resource identifier "VLAM Endpoint 1", (4) the resource identifier "VLAN Endpoint 2", (5) the second mapping rule type "VPN Service Specification to VLAN Path Specification", and (6) the resource identifier "VLAM Path 1".

Figure 26:
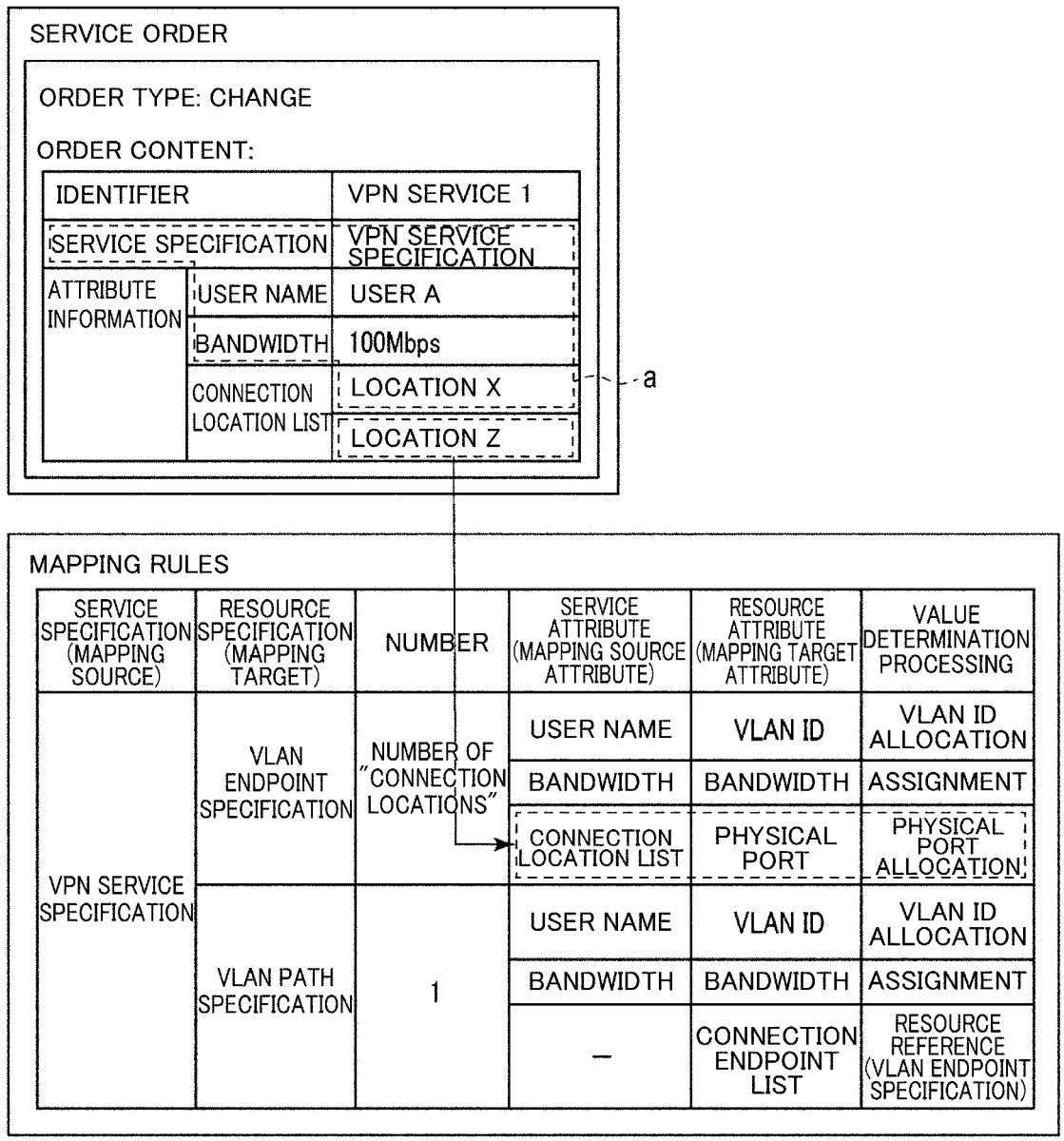
FIG. 26 illustrates an example of a service order due to a connection location change in a service and mapping rules associated with the service order.

FIG. 26 illustrates an example of a service order due to a connection location change in a service and mapping rules associated with the service order.

After the above identification, in S12, the order mapping processing unit 121 identifies the "connection location", "Location Z" in the attribute information which is a part to be changed in the received service order.

Then, the order mapping processing unit 121 identifies (1) the above-identified "connection location list" among the service attributes associated with the first resource specification "VLAN Endpoint Specification" in the mapping rules, (2) the resource isomerism "physical port" associated with that service attribute, and (3) the value determination processing "physical port allocation" associated with that resource attribute.

This identification indicates that, when the value of the attribute "connection location list" in the service order is changed, the value of the attribute "physical port" in the resource order is changed.

In the above identification, the mapping rule affected by the part to be changed in the service is identified to be the mapping rule for the mapping target "VLAN Endpoint Specification".

FIG. 27 illustrates an example of a service order due to a connection location change in a service and a resource order associated with the service order.

After the above identification, in S13, the order mapping processing unit 121 creates a changed resource order by mapping from the changed service order to the resource order using the mapping rule(s) identified in S12.

According to the above-mentioned changed resource configuration information, the resource identifier that has the resource attribute "connection location" identified in S12 as the attribute information and is associated with the "physical port 3" corresponding to the changed "location Z" is "VLAN Endpoint 2". Accordingly, the resource order in which "VLAN Endpoint 2" is set as the resource identifier in the order content is the resource order to be changed.

The service attribute identified in S12 is "Connection Location List", the resource attribute identified in S12 is "Physical Port", and the value determination processing identified in S12 is "Physical Port Allocation".

Accordingly, referring to the above resource configuration information, for example, as illustrated in FIG. 27, the "physical port 3" corresponding to the changed connection location list "location Z" of the attribute information in the changed service order is allocated to the physical port value of the attribute information in the resource order for the resource identifier "VLAN Endpoint 2", which is to be changed. Other contents in this resource order are the same as those before the change.

Figure 28:
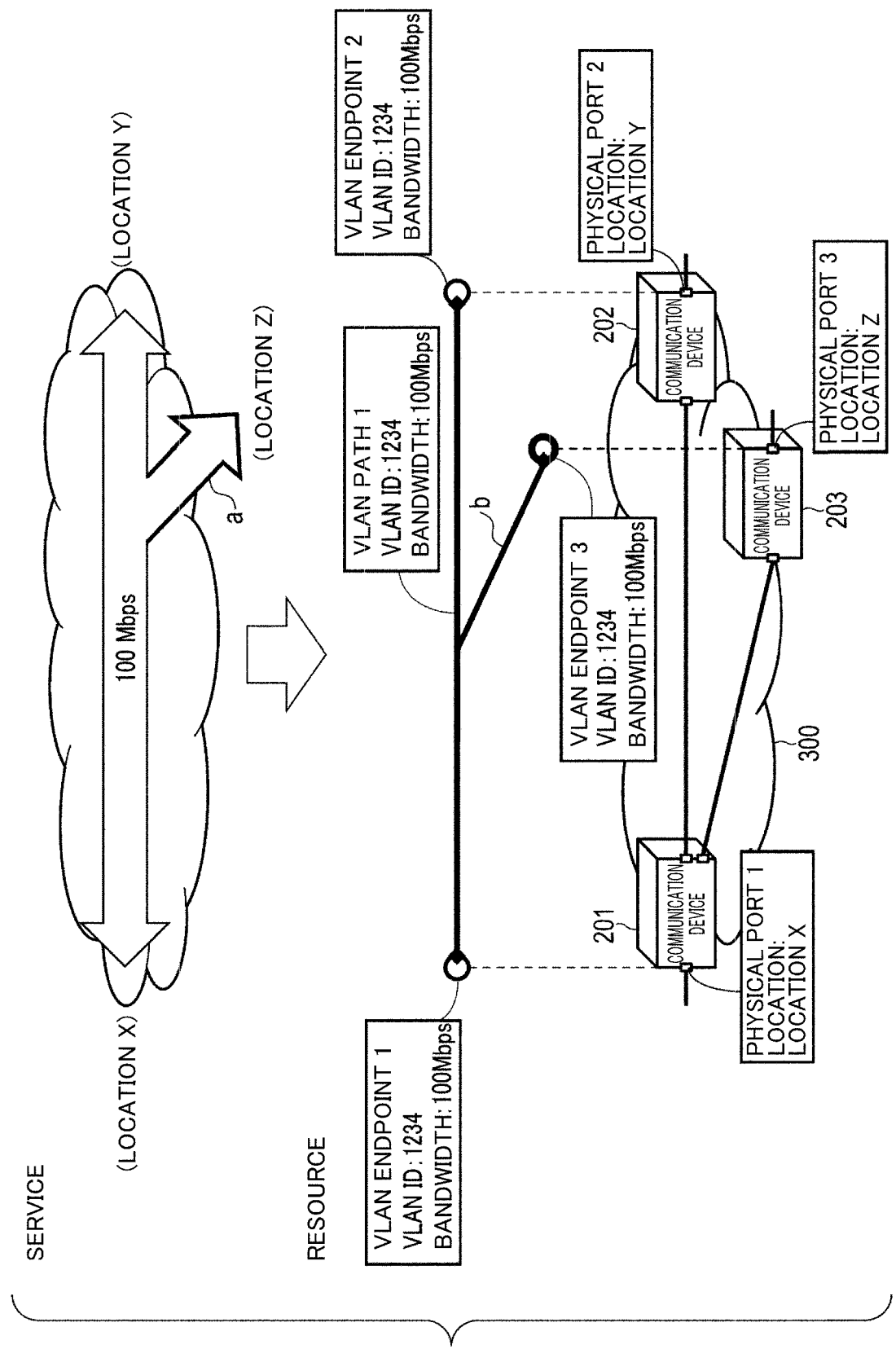
FIG. 28 is a diagram illustrating an example of the change of a resource due to a connection location addition in a service.

Next, processing for a connection location addition in a service will be described. FIG. 28 is a diagram illustrating an example of the change of a resource due to the connection location addition in a service.

The example illustrated in FIG. 28 indicates that the "location Z" is added to the connection location for a service to be provided between the "location X" and the "location Y" (see a in FIG. 28); the service to be provided is changed to be provided between the "location X" and the "location Y" and between the "location X" and the "location Z"; and with this change, the "VLAN endpoint 3" is added to the resources in FIG. 28, and the "VLAN path 1" is changed to a VLAN path connecting the "VLAN endpoint 1" and the "VLAN endpoint 2" and a VLAN path connecting the "VLAN endpoint 1" and the "VLAN endpoint 3" (see b in FIG. 28).

Here, the above-mentioned "VLAN endpoint 3" corresponds to the "physical port 3".

In this change, in the above resource configuration information, it is assumed that the information indicating that one end of the "VLAN path 1" is the "VLAN endpoint 1", the other end of the "VLAN path 1" is the "VLAN endpoint 2" is changed to the information indicating that one end of the "VLAN path 1" is the "VLAN endpoint 1" and the other end of the "VLAN path 1" is the "VLAN endpoint 2" and the "VLAN endpoint 3".

It is also assumed that the information indicating that the "physical port 3" corresponds to the "VLAN endpoint 3" is added as new information to the above resource configuration information.

Figure 29:
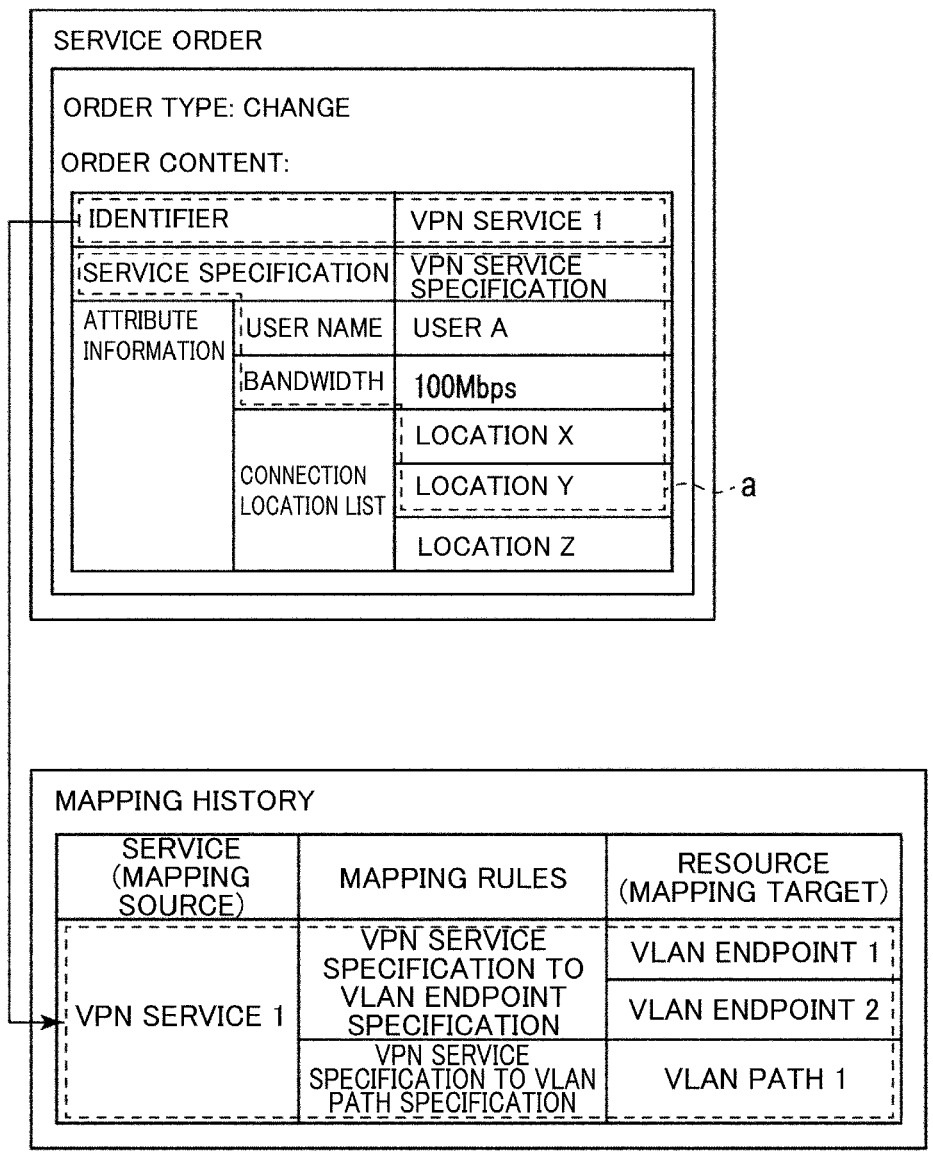
FIG. 29 illustrates an example of a service order due to a connection location addition in a service and a mapping history associated with the service order.

FIG. 29 illustrates an example of a service order due to the connection location addition in a service and a mapping history associated with the service order.

When a connection location is added as illustrated in FIG. 28, as illustrated in FIG. 29, the "location Z" is added to the connection location list in the service order as compared with FIG. 9. Note that the part enclosed by a illustrated in FIG. 21 except for the service identifier has the same content as that before the change.

In this example, as S11, the order mapping processing unit 121 receives the service order subjected to the change as an addition of the connection location illustrated in FIG. 28 from the service management unit 110.

As in the above-described bandwidth change, the order mapping processing unit 121 identifies (1) the same identifier "VPN Service 1" as that set in the "service (mapping source)" in the mapping history, (2) the first mapping rule type "VPN Service Specification to VLAN Endpoint Specification", (3) the resource identifier "VLAM Endpoint 1", (4) the resource identifier "VLAN Endpoint 2", (5) the second mapping rule type "VPN Service Specification to VLAN Path Specification", and (6) the resource identifier "VLAM Path 1".

Figure 30:
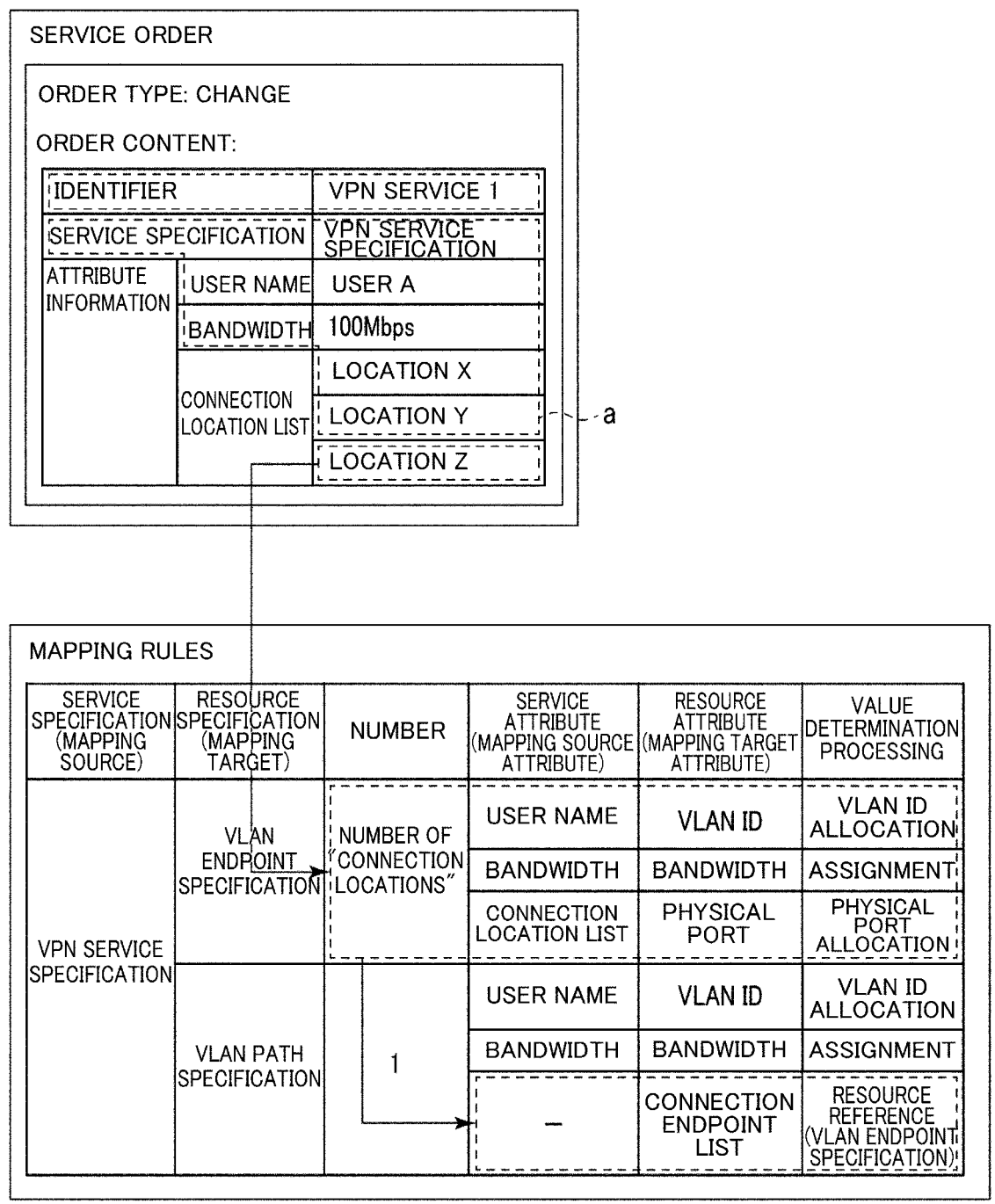
FIG. 30 illustrates an example of a service order due to a connection location addition in a service and mapping rules associated with the service order.

FIG. 30 illustrates an example of a service order due to the connection location addition in a service and mapping rules associated with the service order.

After the above identification, in S12, the order mapping processing unit 121 identifies the "connection location" value, "Location Z" in the attribute information which is a part to be changed (added) in the received service order.

Then, the order mapping processing unit 121 identifies (1) "the number of 'connection locations'" associated with the first resource specification "VLAN Endpoint Specification" in the mapping rules, (2) the service attributes "User Name", "Bandwidth" and "Connection Location List" associated with the "VLAN Endpoint Specification", (3) the resource isomerism "VLAN ID", "Bandwidth", and "Physical Port" associated with the service attributes on a one-to-one basis, and (4) the value determination processing "VLAN ID Allocation", "Assignment", and "Physical Port Allocation" associated with the resource attributes on a one-to-one basis.

Similarly, in S12, the order mapping processing unit 121 uses the above-mentioned "number of 'connection locations'" as a key to identify (1) the resource isomerism "Connection Endpoint List" in the second resource specification "VLAN Path Specification" in the mapping rules, and (2) the value determination processing "Resource Reference (VLAN Endpoint Specification)" associated with that resource attribute.

This identification indicates that, when the number of connection locations in the resources is changed, a resource order is created according to a new VLAN endpoint in which the values of the attributes "VLAN ID", "Bandwidth", and "Physical Port" in the resource order are set as the attribute information, and the value of the physical port corresponding to the new VLAN endpoint is added to the value of the attribute "Connection Endpoint" in the resource order for "VLAN Path 1" created before the service order is changed.

In the above identification, the mapping rules affected by the part to be changed in the service are identified to be the mapping rule for the mapping target "VLAN Endpoint Specification" and the mapping rule for the mapping target "VLAN Path Specification".

Figure 31:
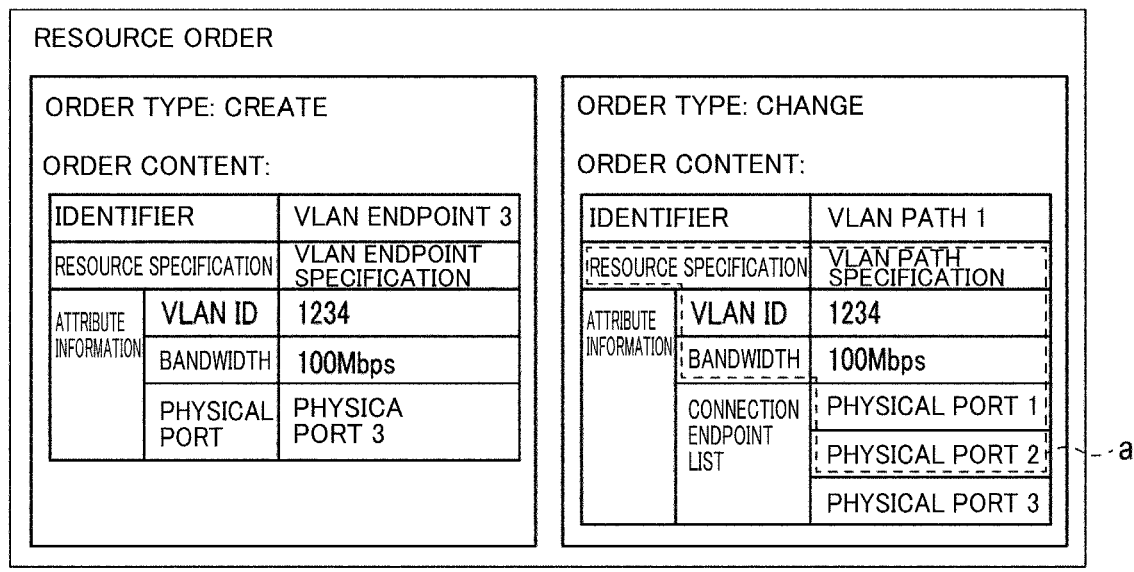
FIG. 31 illustrates an example of a service order due to a connection location addition in a service and a resource order associated with the service order.

FIG. 31 illustrates an example of a service order due to the connection location addition in a service and a resource order associated with the service order.

After the above identification, in S13, the order mapping processing unit 121 creates a changed resource order by mapping from the changed service order to the resource order using the mapping rule(s) identified in S12.

According to the above changed resource configuration information, the resource identifiers that have the resource attributes "VLAN ID", "Bandwidth", and "Physical Port" identified in S12 as the attribute information and are associated with the "physical port 3" corresponding to the added "location Z" are "VLAN Path 1" and the new "VLAN Endpoint 3".

Accordingly, the resource order in which "VLAN Path 1" is set in the order content as the resource identifier is the resource order to be changed, and the resource order in which "VLAN Endpoint 3" is set in the order content as the resource identifier is the resource order to be newly created.

The resource attribute for "VLAN Path Specification" identified in S12 is "Connection Endpoint List", and the value determination processing identified in S12 is "Resource Reference (VLAN Endpoint Specification)".

Accordingly, based on the above-mentioned changed service order and the changed and added resource configuration information, for example, as illustrated in FIG. 31, the connection location list "Location Z" of the attribute information in the changed service order is added as a new value in the connection endpoint list of the attribute information in the resource order for the resource identifier "VLAN Path 1" to be changed.

Other contents in this resource order are the same as those before the change. Note that the part enclosed by a illustrated in FIG. 31 except for the resource identifier has the same content as that before the change.

In addition, the resource attributes for "VLAN Endpoint Specification" identified in S12 are "VLAN ID", "Bandwidth", and "Physical Port", and the value determination processing corresponding to these resource attributes on a one-to-one basis are "VLAN ID Allocation", "Assignment", and "Physical Port Allocation".

Accordingly, based on the changed service order and the changed and added resource configuration information, for example, as illustrated in FIG. 31, a new resource order is created having the resource identifier "VLAN Endpoint 3", the resource specification identifier "VLAN Endpoint Specification", the attribute information "VLAM ID" value, "1234", the attribute information "Bandwidth" value, "100 Mbps", and the attribute information "Physical Port" value, "Physical Port 3".

Figure 32:
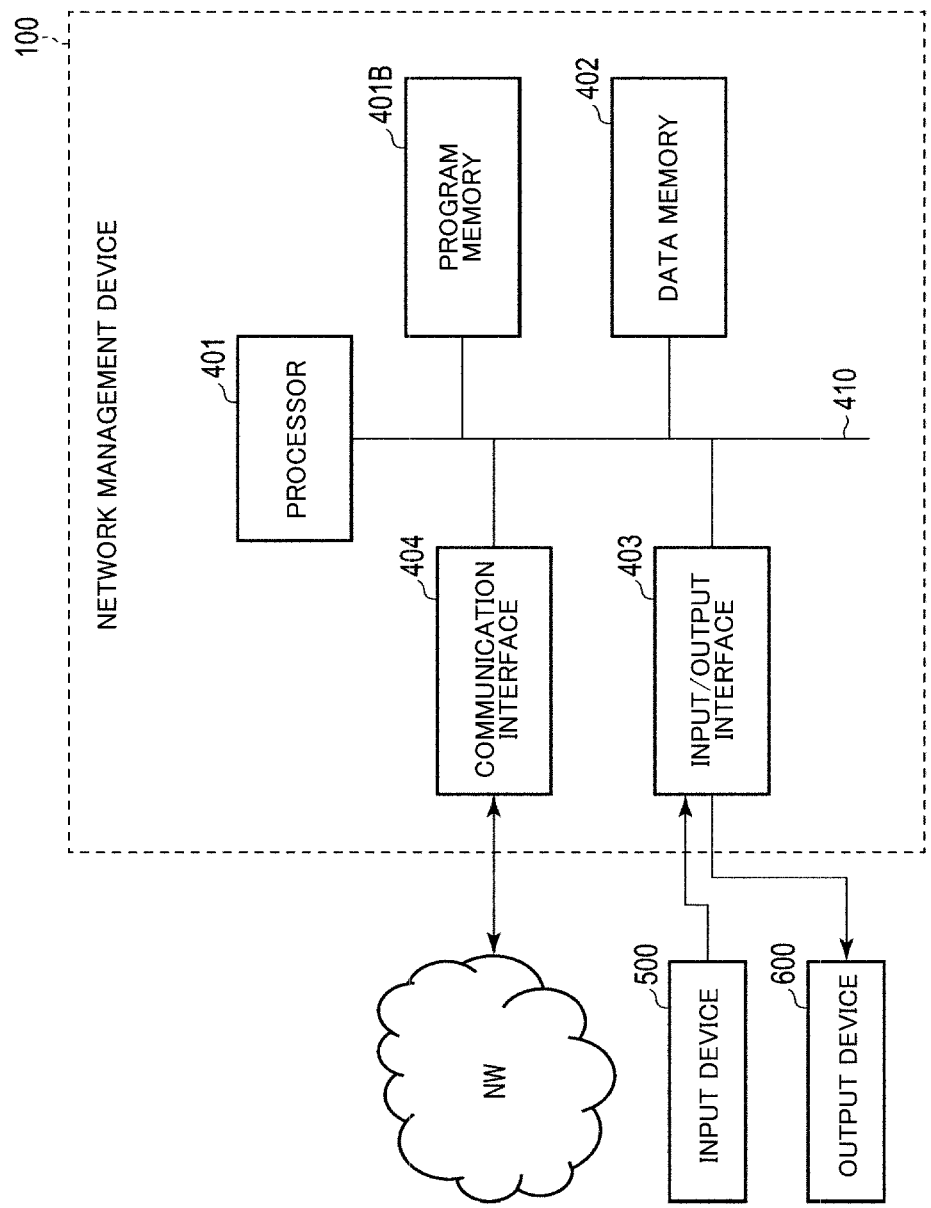
FIG. 32 is a block diagram illustrating an example of the hardware configuration of the network management device according to the embodiment of the present invention.

FIG. 32 is a block diagram illustrating an example of the hardware configuration of the network management device according to the embodiment of the present invention.

In the example illustrated in FIG. 32, the network management device 100 according to the above embodiment is composed of, for example, a server computer or a personal computer, and includes a hardware processor 401 such as a CPU. In addition, a program memory 401B, a data memory 402, an input/output interface 403, and a communication interface 404 are connected to the hardware processor 401 via a bus 410.

The communication interface 404 includes, for example, one or more wireless communication interface units, and enables information to be transmitted and received to and from a communication network NW. As the wireless interface, for example, an interface adopting a low power wireless data communication standard such as a wireless LAN (Local Area Network) is used.

An input device 500 and an output device 600 for an operator, which are attached to the network management device 100, are connected to the input/output interface 403.

The input/output interface 403 receives operation data input by an operator through the input device 500 such as a keyboard, a touch panel, a touchpad, a mouse, and the like, and outputs data to the output device 600 including a display device using such as liquid crystal or organic EL (Electro Luminescence) to perform processing of displaying the data. Note that, as the input device 500 and the output device 600, a device built in the network management device 100 may be used, or an input device and an output device of another information terminal capable of communicating with the network management device 100 via the network NW may be used.

The program memory 401B includes a combination of a non-volatile memory that enables writing and reading at any time, such as an HDD (Hard Disk Drive) or an SSD (Solid State Drive) and a non-volatile memory such as a ROM (Read Only Memory), and stores programs necessary for executing various control processing according to the embodiment.

The data memory 402 is a tangible storage medium including, for example, a combination of the above-mentioned non-volatile memory and a volatile memory such as a RAM (Random Access Memory), and is used to store various data acquired and generated through various processing.

The network management device 100 according to the embodiment of the present invention may be a data processing device including the service management unit 110, the order mapping unit 120, the order mapping processing unit 121, and the resource management unit 130 which are illustrated in FIG. 1 and serve as processing function units by software.

The service specification holding unit 111, the service data holding unit 112, the resource specification holding unit 131, the resource data holding unit 132, the mapping rule holding unit 122, the mapping history holding unit 123, an internal memory, various data storage areas, and various data processing areas of the network management device 100 may be configured using the data memory 402 illustrated in FIG. 32. However, these areas are not indispensable configurations in the network management device 100, and may be areas provided in, for example, an external storage medium such as a USB (Universal Serial Bus) memory, a storage device of such as a database server deployed in a cloud, or the like.

The processing function unit in each of the service management unit 110, the order mapping unit 120, the order mapping processing unit 121, and the resource management unit 130 can be implemented by the hardware processor 401 reading and executing the programs stored in the program memory 401B. Note that one, some or all of these processing function units may be implemented in various other formats, including an integrated circuit such as ASIC (Application Specific Integrated Circuit) or FPGA (Field-Programmable Gate Array).

As described above, the network management device according to the embodiment of the present invention includes a device that stores rules for mapping between a service order and a resource order, and a device that stores a mapping history, when a mapping is performed based on the rules, in which an identifier of a service for the service order which is a mapping source, a type of a rule used for the mapping, and an identifier of a resource for the resource order which is a mapping target are described.

The network management device also, when a service order to change the service is created, acquires, from the mapping history and the identifier of the service to be changed, information indicating types of rules to be used for mapping of the service order to change the service and the identifier of the resource for a resource order which is a mapping target, acquires, from the acquired rules, a rule affected by the change in the order of change, and creates a resource order by mapping of the order to be changed based on the acquired mapping rules.

Therefore, it is possible to generalize not only the processing of mapping between an order to request the creation and deletion of a service and a resource order but also the processing of mapping between an order to request the change of a service and a resource order, so that the cost and period for developing a system due to an increase in service types can be reduced.

Further, the technique described in each embodiment may be stored as a program (software means) that can be executed by a computer, for example in a recording medium such as a magnetic disk (floppy (registered trademark) disk, hard disk, etc.), an optical disc (CD-ROM, DVD, MO, etc.), a semiconductor memory (ROM, RAM, Flash memory, etc.), or the like, and be transmitted and distributed by a communication medium. Note that the program stored on the medium side also includes a setting program for configuring, in the computer, the software means (including not only executable programs but also tables and data structures) to be executed by the computer. The computer that realizes the present device reads the program(s) recorded on the recording medium, configures software means by a setting program in some cases, and executes the above-mentioned processing by controlling the operation by the software means. Note that the recording medium referred to herein is not limited to that for distribution, and includes a storage medium such as a magnetic disk and a semiconductor memory provided in devices connected inside a computer or via a network.

Note that the present invention is not limited to the above embodiments, and can be variously modified at the implementation stage without departing from the spirit and scope thereof. In addition, each embodiment may be carried out in combination as appropriate, in which case the combined effect can be obtained. Further, the above-described embodiments include various inventions, and various inventions can be extracted by a combination selected from a plurality of disclosed constituent requirements. For example, even if some constituent requirements are removed from all the constituent requirements disclosed in the embodiments, a configuration in which the constituent requirements are removed can be extracted as an invention as long as the problem can be solved and the advantageous effect is obtained.

REFERENCE SIGNS LIST

100 Network management device
110 Service management unit
111 Service specification holding unit
112 Service data holding unit
120 Order mapping unit
121 Order mapping processing unit
122 Mapping rule holding unit
123 Mapping history holding unit
130 Resource management unit
131 Resource specification holding unit
132 Resource data holding unit
201, 202, 203 Communication device

The invention claimed is:

1. A network management device that maps between i) a service order to request a service on a network and ii) a resource order to request a resource used for providing the service, the network management device comprising:
   a mapping rule storage device that stores mapping rules for mapping between the service order and the resource order;
   a mapping history storage device that, when a mapping is performed based on the mapping rules, stores a mapping history comprising i) an identifier of a service which is a mapping source for the mapping between the service order and the resource order, ii) a type of a mapping rule used for the mapping between the service order and the resource order, and iii) an identifier of a resource which is a mapping target for the mapping between the service order and the resource order, wherein the service is indicated by the service order and the resource is indicated by the resource order;
   a first acquisition unit implemented by one or more processors configured to, when receiving a change service order to change the service, acquire, from the mapping history and based on the identifier of the service to be changed, i) mapping rules to be used for mapping of the change service order and ii) the identifier of the resource which is a mapping target corresponding to the identifier of the service to be changed;
   a second acquisition unit implemented by the one or more processors configured to acquire, from the mapping rules acquired by the first acquisition unit, a mapping rule affected by the change of the service in the change service order; and
   a creation unit implemented by the one or more processors configured to create a corresponding resource order by mapping of the change service order to change the service based on the mapping rule acquired by the second acquisition unit.

2. The network management device according to claim 1, wherein
   the service order includes the identifier of the service, a type of the service, and attribute information of the service defined for the type of the service,
   the resource order includes the identifier of the resource, a type of the resource, and attribute information of the resource defined for the type of the resource,
   the change service order to change the service is a service order to request the service when the attribute information of the service is changed,
   the second acquisition unit is configured to acquire, from the mapping rules for the service to be changed acquired by the first acquisition unit, the mapping rule affected by the change of the attribute information of the service, and
   the creation unit is configured to create the corresponding resource order in which the attribute information of the resource is changed by mapping of the change service order to change the service again based on the mapping rule acquired by the second acquisition unit.

3. The network management device according to claim 2, wherein
the service order includes, as the attribute information of the service, identification information of a user who uses the service, a bandwidth corresponding to a communication speed for the service, and information indicating a location where the service is provided,
the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource,
the change service order to change the service is a service order to request the service when the bandwidth is changed,
the second acquisition unit is configured to acquire, from the mapping rules for the service to be changed acquired by the first acquisition unit, the mapping rule affected by the change of the bandwidth, and
the creation unit is configured to create the corresponding resource order in which the bandwidth is changed by mapping of the change service order to change the service again based on the mapping rule acquired by the second acquisition unit.

4. The network management device according to claim 2, wherein
the service order includes, as the attribute information of the service, identification information of a user who uses the service, a bandwidth corresponding to a communication speed for the service, and information indicating a location where the service is provided,
the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource,
the change service order to change the service is a service order to request the service when the location where the service is provided is changed,
the second acquisition unit is configured to acquire, from the mapping rules for the service to be changed acquired by the first acquisition unit, the mapping rule affected by the change of the location, and
the creation unit is configured to create the corresponding resource order in which information indicating a physical port corresponding to the changed location is changed by mapping of the change service order to change the service again based on the mapping rule acquired and extracted by the second acquisition unit.

5. The network management device according to claim 2, wherein
the service order includes, as the attribute information of the service, identification information of a user who uses the service, a bandwidth corresponding to a communication speed for the service, and information indicating a location where the service is provided,
the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource,
the change service order to change the service is a service order to request the service when the location where the service is provided is added,
the second acquisition unit is configured to acquire, from the mapping rules for the service to be changed acquired by the first acquisition unit, the mapping rule affected by the addition of the location, and
the creation unit is configured to create the corresponding resource order in which information indicating a physical port installed at the added location is added by mapping of the change service order to change the service again based on the mapping rule acquired and extracted by the second acquisition unit, and create a resource order for a connection endpoint associated with the physical port installed at the added location.

6. A network management method performed by a network management device that maps between i) a service order to request a service on a network and ii) a resource order to request a resource used for providing the service, the network management method comprising:
storing, in a mapping rule storage device, mapping rules for mapping between the service order and the resource order;
storing, in a mapping history storage, when a mapping is performed based on the mapping rules, a mapping history comprising i) an identifier of a service which is a mapping source for the mapping between the service order and the resource order, ii) a type of a mapping rule used for the mapping between the service order and the resource order, and iii) an identifier of a resource which is a mapping target for the mapping between the service order and the resource order, wherein the service is indicated by the service order and the resource is indicated by the resource order;
acquiring, when receiving a change service order to change the service, acquire, from the mapping history and based on the identifier of the service to be changed, i) mapping rules to be used for mapping of the change service order and ii) the identifier of the resource which is a mapping target corresponding to the identifier of the service to be changed;
acquiring, from the acquired mapping rules, a mapping rule affected by the change of the service in the change service order; and
creating a corresponding resource order by mapping of the change service order to change the service based on the acquired mapping rule.

7. A non-transitory computer readable medium storing one or more instructions that cause a processor to function as a network management device that maps between a service order to request a service on a network and a resource order to request a resource used for providing the service, wherein the one or more instructions cause the processor to execute:
storing, in a mapping rule storage device, mapping rules for mapping between the service order and the resource order;
storing, in a mapping history storage, when a mapping is performed based on the mapping rules, a mapping history comprising i) an identifier of a service which is a mapping source for the mapping between the service order and the resource order, ii) a type of a mapping rule used for the mapping between the service order and the resource order, and iii) an identifier of a resource which is a mapping target for the mapping between the service order and the resource order, wherein the service is indicated by the service order and the resource is indicated by the resource order;

acquiring, when receiving a change service order to change the service, acquire, from the mapping history and based on the identifier of the service to be changed, i) mapping rules to be used for mapping of the change service order and ii) the identifier of the resource which is a mapping target corresponding to the identifier of the service to be changed;

acquiring, from the acquired mapping rules, a mapping rule affected by the change of the service in the change service order; and creating a corresponding resource order by mapping of the change service order to change the service based on the acquired mapping rule.

8. The network management method according to claim 6, wherein
the service order includes the identifier of the service, a type of the service, and attribute information of the service defined for the type of the service,
the resource order includes the identifier of the resource, a type of the resource, and attribute information of the resource defined for the type of the resource,
the change service order to change the service is a service order to request the service when the attribute information of the service is changed,
wherein the network management method further comprises:
acquiring, from the mapping rules for the service to be changed, the mapping rule affected by the change of the attribute information of the service, and
creating the corresponding resource order in which the attribute information of the resource is changed by mapping of the change service order to change the service again based on the mapping rule.

9. The network management method according to claim 8, wherein
the service order includes, as the attribute information of the service, identification information of a user who uses the service, a bandwidth corresponding to a communication speed for the service, and information indicating a location where the service is provided,
the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource,
the change service order to change the service is a service order to request the service when the bandwidth is changed,
wherein the network management method further comprises:
acquiring, from the mapping rules for the service to be changed, the mapping rule affected by the change of the bandwidth, and
creating the corresponding resource order in which the bandwidth is changed by mapping of the change service order to change the service again based on the mapping rule.

10. The network management method according to claim 8, wherein
the service order includes, as the attribute information of the service, identification information of a user who uses the service, a bandwidth corresponding to a communication speed for the service, and information indicating a location where the service is provided,
the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource,
the change service order to change the service is a service order to request the service when the location where the service is provided is changed,
wherein the network management method further comprises:
acquiring from the mapping rules for the service to be changed acquired, the mapping rule affected by the change of the location, and
creating the corresponding resource order in which information indicating a physical port corresponding to the changed location is changed by mapping of the change service order to change the service again based on the mapping rule.

11. The network management method according to claim 8, wherein
the service order includes, as the attribute information of the service, identification information of a user who uses the service, a bandwidth corresponding to a communication speed for the service, and information indicating a location where the service is provided,
the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource,
the change service order to change the service is a service order to request the service when the location where the service is provided is added,
wherein the network management method further comprises:
acquiring, from the mapping rules for the service to be changed, the mapping rule affected by the addition of the location, and
creating the corresponding resource order in which information indicating a physical port installed at the added location is added by mapping of the change service order to change the service again based on the mapping rule, and creating a resource order for a connection endpoint associated with the physical port installed at the added location.

12. The non-transitory computer readable medium according to claim 7, wherein
the service order includes the identifier of the service, a type of the service, and attribute information of the service defined for the type of the service,
the resource order includes the identifier of the resource, a type of the resource, and attribute information of the resource defined for the type of the resource, the change service order to change the service is a service order to request the service when the attribute information of the service is changed, wherein the one or more instructions cause the processor to execute:

acquiring, from the mapping rules for the service to be changed, the mapping rule affected by the change of the attribute information of the service, and creating the corresponding resource order in which the attribute information of the resource is changed by mapping of the change service order to change the service again based on the mapping rule.

13. The non-transitory computer readable medium according to claim 12, wherein the service order includes, as the attribute information of the service, identification information of a user who uses the service, a bandwidth corresponding to a communication speed for the service, and information indicating a location where the service is provided, the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource, the change service order to change the service is a service order to request the service when the bandwidth is changed, wherein the one or more instructions cause the processor to execute:

acquiring, from the mapping rules for the service to be changed, the mapping rule affected by the change of the bandwidth, and creating the corresponding resource order in which the bandwidth is changed by mapping of the change service order to change the service again based on the mapping rule.

14. The non-transitory computer readable medium according to claim 12, wherein the service order includes, as the attribute information of the service, identification information of a user who uses the service, a bandwidth corresponding to a communication speed for the service, and information indicating a location where the service is provided, the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource, the change service order to change the service is a service order to request the service when the location where the service is provided is changed, wherein the one or more instructions cause the processor to execute:

acquiring from the mapping rules for the service to be changed, a the mapping rule affected by the change of the location, and creating the corresponding resource order in which information indicating a physical port corresponding to the changed location is changed by mapping of the change service order to change the service again based on the mapping rule.

15. The non-transitory computer readable medium according to claim 12, wherein the service order includes, as the attribute information of the service, identification information of a user who uses the service, a bandwidth corresponding to a communication speed for the service, and information indicating a location where the service is provided, the resource order includes, as the attribute information of the resource, information indicating the bandwidth, information indicating a relationship between a physical port installed at a location where the service is provided and a connection endpoint in the resource, and information indicating a relationship between a communication path and the connection endpoint in the resource, the change service order to change the service is a service order to request the service when the location where the service is provided is added, wherein the one or more instructions cause the processor to execute:

acquiring, from the mapping rules for the service to be changed, the mapping rule affected by the addition of the location, and creating the corresponding resource order in which information indicating a physical port installed at the added location is added by mapping of the change service order to change the service again based on the mapping rule, and creating a resource order for a connection endpoint associated with the physical port installed at the added location.

\* \* \* \* \*